(12) United States Patent
Wang et al.

(10) Patent No.: US 12,547,786 B2
(45) Date of Patent: Feb. 10, 2026

(54) CAD COLLABORATIVE DESIGN SYSTEM

(71) Applicant: SUZHOU GSTARSOFT COMPANY LIMITED, Suzhou (CN)

(72) Inventors: Wei Wang, Suzhou (CN); Hui Xi, Suzhou (CN); Tao Deng, Suzhou (CN); Chuanjie Yuan, Suzhou (CN); Jiang Liang, Suzhou (CN); Xiang Lu, Suzhou (CN)

(73) Assignee: SUZHOU GSTARSOFT COMPANY LIMITED, Suzhou (CN)

( * ) Notice: Subject to any disclaimer, the term of this patent is extended or adjusted under 35 U.S.C. 154(b) by 1214 days.

(21) Appl. No.: 17/259,249

(22) PCT Filed: Jul. 15, 2019

(86) PCT No.: PCT/CN2019/096035
§ 371 (c)(1),
(2) Date: Mar. 29, 2021

(87) PCT Pub. No.: WO2020/015613
PCT Pub. Date: Jan. 23, 2020

(65) Prior Publication Data
US 2021/0216678 A1     Jul. 15, 2021

(30) Foreign Application Priority Data

Jul. 16, 2018  (CN) .......................... 201810777826.7
Jul. 16, 2018  (CN) .......................... 201810778814.6
(Continued)

(51) Int. Cl.
*G06F 30/13*  (2020.01)
*G06F 30/12*  (2020.01)
*G06F 111/02*  (2020.01)

(52) U.S. Cl.
CPC .............. *G06F 30/13* (2020.01); *G06F 30/12* (2020.01); *G06F 2111/02* (2020.01)

(58) Field of Classification Search
CPC .......... G06F 30/13; G06F 30/12; G06F 30/18; G06F 2111/02; G06F 11/1451;
(Continued)

(56) References Cited

U.S. PATENT DOCUMENTS 6,205,451 B1    3/2001  Norcott et al.
6,341,291 B1 *  1/2002  Bentley .................. G06F 16/21
                                                   707/999.203
(Continued)

FOREIGN PATENT DOCUMENTS

CN      101582069 A    11/2009
CN      102339318 A     2/2012
(Continued)

OTHER PUBLICATIONS

Doboš, Jozef, Niloy J. Mitra, and Anthony Steed. "3D Timeline: Reverse engineering of a part-based provenance from consecutive 3D models." Computer Graphics Forum. vol. 33. No. 2. 2014. (Year: 2014).*

(Continued)

*Primary Examiner* — Michael Edward Cocchi
(74) *Attorney, Agent, or Firm* — JCIP; Joseph G. Chu

(57) ABSTRACT

The present invention relates to a CAD collaborative design system, for storing CAD files according to a timeline, and that facilitates restoration and review of versions created, modified, and updated at different times. The system stores the CAD files by means of summary files and incremental databases, thereby reducing data transmission volume, ensuring accuracy of file restoration, and improving the file management efficiency of the entire CAD system.

13 Claims, 14 Drawing Sheets

(30) Foreign Application Priority Data

Jul. 16, 2018 (CN) .......................... 201810779355.3
Jul. 16, 2018 (CN) .......................... 201810779485.7

(58) Field of Classification Search
CPC .. G06F 11/1469; G06F 2201/80; G06F 30/00; G06F 30/10; G06F 16/5866; G06F 30/20; G06F 30/25; G06F 30/27; G06F 30/28

See application file for complete search history.

(56) References Cited

U.S. PATENT DOCUMENTS

| | | | |
|---|---|---|---|
| 10,318,673 B2 * | 6/2019 | Trent | .......................... G06F 9/50 |
| 2004/0268244 A1 | 12/2004 | Levanoni et al. | |
| 2013/0166538 A1 * | 6/2013 | Hadley | ................. G06F 16/907 |
| | | | 707/E17.014 |

FOREIGN PATENT DOCUMENTS

| | | |
|---|---|---|
| CN | 102411605 A | 4/2012 |
| CN | 102567547 A | 7/2012 |
| CN | 102622476 A | 8/2012 |
| CN | 103324660 A | 9/2013 |
| CN | 104239443 A | 12/2014 |
| CN | 106970856 A | 7/2017 |

OTHER PUBLICATIONS

Doboš, Jozef, Niloy J. Mitra, and Anthony Steed. "3D Timeline: Reverse engineering of a part-based provenance from consecutive 3D models." Computer Graphics Forum. vol. 33. No. 2. 2014. (Year: 2014).*
Europe PMC Consortium. "Europe PMC: a full-text literature database for the life sciences and platform for innovation." Nucleic acids research 43. D1 (2015): D1042-D1048. (Year: 2015).*
Wu, Shann-chiuen, and Tzao-lin Lee. "Design and Implementation of Chronological Web Server for Web-Based Applications." 2006 International Conference on Software Engineering Advances (ICSEA'06). IEEE, 2006. (Year: 2006).*
International Search Report for International Application No. PCT/CN2019/096035.
Written Opinion of International Searching Authority for International Application No. PCT/CN2019/096035.
Chinese Search Report and Office Action for Chinese Application No. 201910634339X.

* cited by examiner

CAD COLLABORATIVE DESIGN SYSTEM

APPLICATION PRIORITY

The present application claims the priority from Chinese invention patent applications (i) CN201810778814.6 "a timeline management method and system for CAD graphical data", (ii) CN201810779355.3 "a referencing method for an external file in a CAD graphical system", (iii) CN201810779485.7 "a hierarchical display system referenced by a CAD graphical system" and (iv) CN201810777826.7 "a method for viewing reference change of CAD drawings in an editable drawing environment", filed on Jul. 16, 2018, the disclosures of which are hereby incorporated to herein in full by reference.

TECHNICAL FIELD

The present invention relates to a (Computer Aided Design) CAD collaborative design system.

BACKGROUND

ACAD collaborative design project has three characteristics: the first characteristic comprises multiple professions, multiple graphical files and complex reference relationships among the graphical files; the second characteristic comprises complex drawing file formats which are mainly binary data, and with relatively high data randomness; and the third characteristic comprises relatively large file sizes which could range from a few MB to hundreds of MB. With the improvement of computer hardware technologies, the sizes of the drawing files may be even larger in the future. Especially in the promotion process of the collaborative design project, professional engineers need to constantly refer to the mutually shared CAD drawings to draw their own drawings (for example, when drawing water supply and drainage CAD drawings, water supply and drainage engineers need to refer to the construction drawings which are being drawn by construction engineers and have not yet been completed). The reference between the collaborating parties may also be multi-level reference (for example, HVAC drawings refer to electrical drawings, the electrical drawings also refer to water supply and drainage drawings, and the water supply and drainage drawings also refer to the construction drawings). Moreover, the drawings often need to be modified repeatedly in the drawing process, and repeatedly considered and selected between different versions.

The traditional CAD system has many drawbacks in file management, transmission and storage and file reference functions (e.g., external reference). For example, CAD file storage and data transmission are expensive and inefficient, and it is often inconvenient for CAD users to view CAD file versions created and edited at different times. In addition, due to the limitation of the characteristics of external reference citation modes, a series of problems arise: (i) when the current CAD drawings refer to external files, the filtering means are limited, and it is difficult to accurately focus on the elements which are most concerned by the current user; (ii) it is difficult to conveniently handle a nesting relationship, and it is cumbersome to switch between the "overlay mode" and the "attach mode" of the nesting mode; and (iii) the change of the contents of the referenced drawing cannot be viewed while the current CAD drawing is being edited, and the user must switch between an editing interface and a change viewing interface, which is very troublesome. All of these negatively affect the working efficiency of CAD collaborative design and might even entail a risk of causing confusion in the collaborative design project.

SUMMARY

With respect to the above technical problems, the present invention provides a novel CAD collaborative design system, which comprises four sub-inventions (i.e., Invention A, Invention B, Invention C and Invention D) and various variants and extensions based on the four sub-inventions.

The present invention firstly discloses a timeline management system (and method, computer storage medium and computer terminal) for CAD files, comprising: a first data summary file and an incremental database; the first data summary file comprises a first data item index table and first data summary information; the incremental database stores first data detailed information corresponding to the first data summary information; the first data item index table is operable to search the first data detailed information corresponding to the first data summary information in the incremental database; the data summary file is configured to be associated with a first restore point. The present invention manages the CAD files by means of the data summary files and the incremental database, which can reduce the data transmission amount during file restoration by transferring incremental data, and can also restore CAD files quickly and accurately through information preservation integrity of the data summary files.

In another aspect, the present invention also discloses a referencing method and referencing device for an external file in a CAD system, a computer readable storage medium and a computer terminal. The referencing method comprises the following steps: creating at least one first general referencing rule file independent of a referenced file according to at least one referencing condition, and storing the first general referencing rule file independently in an extensible file format; and referencing at least one of the referenced file according to at least one of the first general referencing rule file selected. As the present invention adopts referencing rule files which are independent of the referenced files, the referencing rule files can be used repeatedly by users, thereby avoiding the repeated settings of the referencing conditions, and improving the efficiency and accuracy in collaborative drawing work of the users.

In another aspect, the present invention also discloses a hierarchical operating system (and method, computer storage medium and computer terminal) referenced by a CAD system, comprising: a first file comprising at least one first element; a second file comprising at least one second element; the at least one first element is copied and superimposed to the second file; the at least one first element is associated with a first control point; and independent operations for the at least one first element can be achieved through the first control point. The present invention alleviates the problem in the existing CAD system that an external referencing mode is difficult to convert a nested content display mode (i.e., in an overlay mode and an attach mode) to make CAD users conveniently and rapidly choose to display or hide the nested content and to achieve convenient and quick citation/reference for multi-level drawings, thereby increasing the working efficiency in collaborative design of CAD drawings.

In another aspect, the present invention also discloses a method (and system, computer storage medium and computer terminal) for viewing reference change of a CAD drawing in an editable environment, comprising the following steps: DS101 acquiring a first file and a second file; DS102 referencing the second file by the first file, and superimposing a first element on the second file into the first file; DS103 acquiring a third file; DS104 acquiring a first change element of the third file compared with the second file; and DS105 superimposing the first change element into the first file. The present invention allows the CAD drawing users to view the update(s) of the referenced drawing while continuing to edit the current CAD drawing, thereby alleviating the technical problem in the existing CAD system, wherein the changes of the referenced drawing have to be displayed and viewed outside the current CAD drawing, and thereafter, the user needs to go back to the current CAD drawing to continue editing. Accordingly, the present invention improves the convenience and efficiency of CAD collaborative design.

Compared with the traditional CAD system, the CAD collaborative design system provided by the present invention enables storing the CAD files according to the timeline, and the versions created, modified and updated at different times can be restored and viewed conveniently and quickly. The arrangement of the summary files and the incremental database reduces the data transmission amount, ensures the accuracy in file restoration and increases the file management efficiency of the whole CAD system.

A new referencing method allows CAD drawing engineers to filter the content of referenced file conveniently, and to share a user's own referencing rules with other collaborating parties. The multi-level presentation mode avoids many problems associated with the nesting of the existing external reference and accordingly increases the flexibility when external files are referenced. Finally, the present invention copies and superimposes the referenced content (which can be filtered and selectively displayed) into the currently edited CAD file to achieve synchronous operation of editing the current file and viewing the change of the referenced content on the same interface, so that collaborative work is more convenient and efficient.

DESCRIPTION OF DRAWINGS

To more clearly describe the technical solution in the embodiments of the present invention or in the prior art, the drawings required to be used in the description of the embodiments or the prior art will be simply presented below. In all the drawings, similar elements or parts are generally marked by similar drawings. In the drawings, each element or part is not necessarily drawn in accordance with an actual proportion. Apparently, the drawings in the following description are some embodiments of sub-inventions of the present invention including Invention A, Invention B, Invention C and Invention D, and for those ordinary skilled in the art, other drawings can also be obtained according to the drawings without contributing creative labor.

FIG. 26 is a schematic diagram of an embodiment of Invention C in which a referencing drawing c is removed from drawing a;

FIG. 27 is a schematic diagram of an embodiment of Invention C in which a referencing drawing b and a referencing drawing c are removed from drawing a;

DETAILED DESCRIPTION

Figure 1:
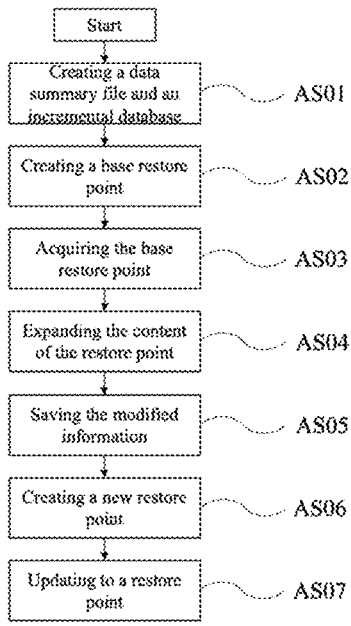
FIG. 1 is a flow chart of an embodiment of a timeline management method for CAD graphical data in Invention A.

To make the objectives, the technical solutions and advantages of the embodiments of the present invention clearer, the technical solutions in the embodiments of the present invention will be clearly and fully described below in combination with the drawings in the embodiments of the present invention. Apparently, the described embodiments are part of the embodiments of the present invention, not all of the embodiments. Based on the embodiments in the present invention, all other embodiments obtained by those ordinary skilled in the art without contributing creative labor will belong to the protection scope of the present invention.

Herein, suffixes such as "module", "component" or "unit" used to indicate elements is only for the purpose of facilitating the description of the present invention and has no specific meaning. Therefore, "module", "component" or "unit" can be used interchangeably.

It should be noted that the sub-inventions of the present invention (Invention A, Invention B, Invention C and Invention D) can be combined to derive other technical solutions, alleviate more technical problems, and achieve more technical effects. Therefore, the description of each sub-invention herein can be mutually confirmed, explained, illustrated, combined, integrated and merged. For example, some embodiments of Invention B, Invention C and Invention D can be combined together to form a more efficient and convenient technical solution for referencing external files. The combination of Invention A and other sub-inventions can more efficiently store and share the edited and modified CAD files with all collaborating parties.

However, the description of each sub-invention herein may involve some identical or similar word. If the identical or similar words conflict or contradict in understanding and meaning, then the understanding and meaning of the words in the description of the respective sub-inventions shall prevail. For example, the words "first file", "second file", and "referenced file" may appear in different sub-inventions. Then, the "first file" in Invention B is based on the understanding and meaning in Invention B, and the "first file" in Invention C is subject to the understanding and meaning in Invention C.

Definitions

"Entity": the entity herein refers to the graphical data on the CAD file, and is displayed on a CAD drawing interface. The entity has attributes, i.e., data values which control specific visual features (such as visibility, colors and line styles) of the entity or element. In different embodiments, entities may also be known as "graphic elements" or "graphic primitives".

"Object": the object herein refers to the information on the CAD file, which will not be displayed on the CAD drawing interface, such as layer, text style and dimension style. The "style" herein refers to a collection of attribute names used to classify and define specific geometric and text elements (such as line styles or text styles).

"Element": the element herein refers to all possible information on the CAD file, including "entities" and "objects", and can also be blocks, groups and unit definitions based on "entities" and/or "objects".

"File": the file herein refers to all kinds of files which can be run in the CAD system for drawing, editing, modifying, storing and viewing CAD drawings. Common CAD file formats include, but are not limited to, DWG, DXF, DWT, DWF, DWL, DWS, DWX, MNU, MNC, MNL, MNS, CUI, CUIX, SHX, PAT, LIN, CTB, STB, PLT and PC3.

"Collaborating party": the collaborating party herein refers to users who participate in a drawing project and work collaboratively with each other. The professions of the collaborating parties may be the same (for example, engineers of multiple construction professions draw together) or different (for example, construction engineers, water supply and drainage engineers, electrical engineers and HVAC engineers draw together), and the collaborating parties mutually refer to the drawings drawn by each other.

"Control point": herein (especially in Invention C), the control point refers to an abstract description for a certain group of operating elements (including entities, objects, blocks and groups), which is similar to the concept of a "handle". A set can be quickly located through the control point so as to perform a series of operations on the elements in the set. Of course, in some special cases, the group/set may also include only one operating element. In addition, herein, "association" with the control point means accepting the control of the control point, and an operating object associated with the control point can be operated through the control point.

Invention A: A Timeline Management System and Method for CAD Files, a Computer Readable Storage Medium and a Computer Terminal Invention A relates to the field of CAD, and in particular to a timeline management method and system for CAD graphical data.

In recent years, Internet technology, especially mobile Internet technology, has been widely used in the field of CAD design. The original CAD entire-drawing transmission technology is expensive and inefficient, which is not conducive to collaborative design and work-sharing on the Internet and mobile fields. In recent years, a source code version control system (abbreviated as VCS) represented by Subversion (abbreviated as SVN) and Git has been widely used in the field of software collaborative development, but such software is mainly used for small-sized plain text files. The CAD graphical data is generally binary, complex in formats and much larger in sizes.

The VCS represented by Subversion stores information in the form of a file change list. Such a system regards the information saved therein as a group of base files and the cumulative differences of each file over time. When a version (i.e., a restore point) is created, the differences from the previous version are generated and recorded. To trace a historical version, it starts from a base file, and the differences on each restore point are merged sequentially to finally restore a file version needed by the user. Because what are stored are the differences, the data amount in such a system is relatively small. However, because the differences need to be analyzed and processed, the algorithm is relatively complex, the calculation is large and are accordingly more prone to errors.

The VCS represented by Git stores information in the form of full-file snapshots. Such a system regards the data as a group of snapshots of a small file system. When the user creates a restore point, submits an update, or saves a project status in the system, the system mainly makes a snapshot of all the current files and saves the index of the snapshot. To improve the efficiency, if the file is not modified, then the file is not re-saved, instead, only a link to the previously stored file is reserved. On the contrary, even if a minor modification is made, the entire file needs to be re-saved. Because the full-file snapshot is stored, the data amount in such a system is relatively large. However, because the snapshot is complete and does not need to handle the differences, the algorithm is simple, and has higher performance and reliability. However, the I/O overhead in the transmission of the snapshot is much higher than the transmission of only the differences.

The CAD design project has three characteristics: the first characteristic comprises multiple professions, multiple graphical files and complex reference relationships among the graphical files; the second characteristic comprises complex drawing file formats which are mainly binary data, and with relatively high data randomness; and the third characteristic comprises relatively large file sizes which could range from a few MB to hundreds of MB. With the improvement of computer hardware technologies, the sizes of the drawing files may be even larger in the future.

Traditional CAD drawing management systems (management software, network disks and cloud storage systems) do not have the timeline function, or take the entire CAD file as a unit to archive and generate versions (similar to the Git system, which also stores information in the form of the full-file snapshots) when storing and transmitting CAD drawings and files. Even if the content of each change of the drawings and files is very minor, the system needs to store and transmit the complete drawings and files when processing the design change, resulting in high data overhead and large traffic consumption.

Moreover, the CAD design project comprises multiple graphical files and the size of each graphical file is relatively large. Therefore, if the data storage mode of the full-file snapshot is adopted, the number of files and the number of restore points will increase continuously as the timeline elapses, and the number of snapshots also accumulates continuously. The data overhead required by access and transmission of the snapshots will become remarkably large.

In addition, because the graphical files of the CAD design project are in a complex binary format and large in size, if the storage mode (i.e., difference accumulation mode) represented by Subversion is adopted, the algorithm for collecting and processing the difference data will be inevitably complicated, slow in calculation and prone to errors. Due to the high randomness of the data, even if a modification is small, the file data of two versions may be quite different. Therefore, the storage advantage of the difference accumulation mode might be insignificant relative to the full-file snapshot mode.

The objective of Invention A is to provide a novel CAD file management mode that can be applied to the CAD collaborative design system, so as to mitigate or alleviate the technical problems of file storage, transmission and management in the existing CAD system to a certain extent.

A timeline management system for CAD files comprises: a first data summary file and an incremental database; the first data summary file comprises a first data item index table and first data summary information; the incremental database stores first data detailed information corresponding to the first data summary information; the first data item index table is operable to search the first data detailed information corresponding to the first data summary information in the incremental database; the data summary file is configured to be associated with a first restore point.

Further, Invention A also comprises: a time axis, wherein the first restore point is set on the time axis according to creating time of the first restore point.

Further, the time axis comprises a plurality of restore points, and the plurality of restore points are arranged in sequence according to their respective creating time.

Further, Invention A also comprises a second data summary file comprising a second incremental data item index table and second data summary information; incremental data detailed information of the second data summary information relative to the first data summary information is stored in the incremental database; the second incremental data item index table is operable to search second data detailed information corresponding to the second data summary information in the incremental database; and the second data summary file is configured to be associated with a second restore point.

Further, the first restore point and the second restore point are arranged on the time axis in sequence according to their respective creating time.

Further, the second data detailed information comprises (i) the incremental data detailed information, and (ii) part or all of the detailed information in the first data detailed information.

Further, the first data summary file is saved in a full-file snapshot mode.

Further, the first data summary file is generated based on one or more CAD drawings, and the one or more CAD drawings are related to a same project.

Further, the first data summary information comprises one or more summary information of author information, creating time, modification time and/or thumbnails.

Further, the first data detailed information is a metadata item.

Further, the first data detailed information comprises one or more CAD elements, and element attributes corresponding to the one or more CAD elements; and the element attributes comprise insertion positions of the elements in CAD drawing, stretch ratio, starting point and end point information and/or rendering information.

Invention A also discloses a user terminal of a CAD system, comprising: a restore point acquisition module operable for acquiring first restore point from a timeline storage device; a restore point analysis module connected with the restore point acquisition module and operable for analyzing first data summary file associated with the first restore point, wherein the first data summary file comprises a first data item index table and first data summary information; a file restoration module connected with the restore point analysis module and operable for acquiring the first data item index table and the first data summary information, acquiring first data detailed information corresponding to the first data summary information from incremental database of the timeline storage device and restoring to generate a first file.

Further, Invention A also comprises: the restore point acquisition module is operable to acquire the first restore point on a time axis in the timeline storage device.

Further, the restore point acquisition module also acquires a second restore point from the timeline storage device; the restore point analysis module acquires a second data summary file through the second restore point, comprising a second incremental data item index table and second data summary information; the file restoration module acquires second data detailed information corresponding to the second data summary information from the incremental database of the timeline storage device based on the second incremental data item index table and the second data summary information, and restores to generate a second file.

Further, the second data detailed information comprises: (i) incremental data detailed information of the second data summary information relative to the first data summary information stored in the incremental database; and (ii) part or all of the detailed information in the first data detailed information.

Further, the first data summary file is saved in a full-file snapshot mode.

Further, the first data summary file comprises one or more CAD drawings related to a same project.

Further, the first data summary information comprises one or more summary information of author information, creating time, modification time and/or thumbnails.

Further, the first data detailed information is a metadata item.

Further, the first data detailed information comprises one or more CAD elements, and element attributes corresponding to the one or more CAD elements; and the element attributes comprise insertion positions of the elements in CAD drawing, stretch ratio, starting point and end point information and/or rendering information.

Invention A also discloses a timeline management method for CAD files, comprising the following steps: AS101 acquiring one or more first CAD files; AS102 creating a first data summary file based on the one or more first CAD files, the first data summary file comprising a first data item index table and first data summary information of the one or more CAD files; AS103 extracting first data detailed information corresponding to the first data summary information from the one or more first CAD files, storing the first data detailed information into an incremental database, and recording a first storage path into the first data item index table; AS104 creating a first restore point and associating the first data summary file with the first restore point.

Further, Invention A also comprises the following step: AS105 recording the first restore point on a time axis according to creating time of the first restore point.

Further, Invention A also comprises the following steps: AS106 acquiring one or more second CAD files; AS107 creating a second data summary file based on the one or more second CAD files, the second data summary file comprising a second data item index table and second data summary information of the one or more CAD files; AS108 comparing the first data summary file with the second data summary file; storing the incremental data detailed information of the second data summary file relative to the first data summary file into the incremental database, so that the incremental database comprises all second data detailed information corresponding to the second data summary information; and recording a second storage path into the second data item index table; AS109 creating a second restore point, and associating the second data summary file with the second restore point.

Further, Invention A also comprises the following step: AS110 recording the second restore point on the time axis according to creating time of the second restore point.

Further, the first data summary file is saved in a full-file snapshot mode.

Further, the one or more first CAD files are related to a same project.

Further, the first data summary information comprises one or more summary information of author information, creating time, modification time and/or thumbnails.

Further, the first data detailed information is a metadata item.

Further, the first data detailed information comprises one or more CAD elements, and element attributes corresponding to the one or more CAD elements; and the element attributes comprise insertion positions of the elements in CAD drawing, stretch ratio, starting point and end point information and/or rendering information.

Invention A also discloses a method for restoring CAD files, comprising the following steps: AS201 acquiring a first restore point and a first data summary file associated with the first restore point from a timeline storage device, the first data summary file comprising a first data item index table and first data summary information; AS202 acquiring first data detailed information corresponding to the first data summary information from an incremental database of the timeline storage device according to the first data item index table and the first data summary information; AS203 restoring to generate a first file based on the first data summary file according to the first data detailed information.

Further, the first restore point is recorded on a time axis of the timeline storage device.

Further, Invention A also comprises the following steps: AS204 acquiring a second restore point and a second data summary file associated with the second restore point from the timeline storage device, the second data summary file comprising a second data item index table and a second data summary information; AS205 acquiring incremental data detailed information from the incremental database according to the second data item index table and incremental data of the second data summary information relative to the first data summary information, wherein the incremental data detailed information corresponds to the incremental data; AS206 restoring to generate a second file according to the second data summary file in combination with the first data detailed information and the incremental data detailed information.

Further, the first data summary file is saved in a full-file snapshot mode.

Further, the first data summary file is generated based on one or more CAD drawings, and the one or more CAD drawings are related to a same project.

Further, the first data summary information comprises one or more summary information of author information, creating time, modification time and/or thumbnails.

Further, the first data detailed information is a metadata item.

Further, the first data detailed information comprises one or more CAD elements, and element attributes corresponding to the one or more CAD elements; and the element attributes comprise insertion positions of the elements in CAD drawing, stretch ratio, starting point and end point information and/or rendering information.

To make the objective, the technical solution and advantages of the embodiments of Invention A clearer, the technical solution in the embodiments of Invention A will be clearly and fully described below in combination with the drawings in the embodiments of Invention A. Apparently, the described embodiments are part of the embodiments of Invention A, not all of the embodiments. Based on the embodiments in Invention A, all other embodiments obtained by those ordinary skilled in the art without contributing creative labor will belong to the protection scope of Invention A.

Embodiment 1 of Invention A

The CAD graphical data of Invention A comprises two parts: one part is a data summary file, and the other part is an incremental database for accessing actual data.

The data summary file comprises two parts. The main part is an index table for retrieving data items in the incremental database, and the other part is used to store other necessary graphical data summary information, such as author, creating time, modification time and thumbnails, etc.

The incremental database is used to store the detailed data of an object in the CAD graph, i.e., the metadata item which comprises all the necessary information to construct the object. When the graph is modified, the metadata of an added or modified object is added to the database to form a new data item.

The timeline of the CAD design project comprises a series of restore points arranged over time. Each restore point makes a full-file snapshot based on the data summary for the current file, and makes an index to the full-file snapshot of the data summary. Each file on the restore point has a corresponding data summary file. The data summary is used to retrieve necessary metadata sets from the incremental database when the file is restored.

As shown in FIG. 1, Invention A discloses a timeline management method for CAD graphical data, comprising the following steps:

Step AS01, Installing a Timeline Storage Device A200 to Classify and Store Data

The timeline storage device A200 is configured to create a corresponding data summary file A202 and a corresponding incremental database A204 for all selected CAD graphs. The timeline storage device A200 reads and analyzes all the selected CAD graphs, records the object metadata in each CAD graphical file into the corresponding incremental database A204, calculates the index A206 of each data item, fills the index A206 to the data summary file A202 and saves the index A206. The data summary file A202 comprises an index table A206 for retrieving data items in the files of the incremental database A204, and other necessary graphical data summary information (such as author, creating time, modification time and thumbnails). The incremental database A204 is used to store the detailed data of the object in the CAD graph, i.e., the metadata item. When the graph is modified, the metadata of an added or modified object is added to the incremental database to form a new data item.

Step AS02, Creating a Base Restore Point A208

A CAD user imports a group of required CAD graphs into the timeline storage device A200 through an importing function.

It should be noted that Invention A adopts a "global timeline" mode, i.e., each restore point (including the base restore point) contains a whole set of related CAD graphs (such as construction drawings, water supply and drainage drawings, electrical drawings and HVAC drawings which are all related to one engineering project). In other words, Invention A creates a timeline for the whole set of CAD graphs, rather than creating a separate timeline for each CAD drawing. The advantage of such a global timeline is that the CAD user can obtain a full set of CAD drawings related to the project at the time point of each restore point, which is conducive to the overall management of multi-person, multi-profession and multi-version CAD drawings and avoids confusion.

For this group of data summary files A202 to be synchronized to a server, the timeline storage device A200 creates a base restore point A208 for this group of data summary files A202; the timeline storage device A200 sends the created base restore point information A208, the selected data summary files A202 and the related incremental data A204 to the server; and the server creates an archive.

Step AS03, Acquiring the Base Restore Point A208

By checkout, the base restore point A208 of the CAD design project is obtained from the server, and the timeline storage device A200 downloads the selected base restore point A208 to a local computer of the CAD user, and locally creates a working snapshot for the base restore point A208.

Step AS04, Expanding the Content of the Restore Point

The data summary file A202 in the working snapshot is opened through CAD software. The timeline storage device A200 analyzes the index table A206 of the data summary file A202, synchronizes the graphical data to the local incremental database A204 in an incremental manner, and then assembles the graphical data into a data format that can be recognized by CAD editing software.

Step AS05, Saving the Modified Information

CAD software is used to modify and save the CAD graphs. The timeline storage device A200 analyzes the modification, saves the added, deleted or modified object data information into the incremental database A204, and then updates the corresponding data summary files A202a (for example, the index table is updated to A206a).

Step AS06, Creating Anew Restore Point A210

A group of data summary files to be synchronized to the server is selected; the timeline storage device A200 creates a new restore point A210 for this group of data summary files A202a; the timeline storage device A200 sends the created new restore point information A210, the selected data summary files A202a and the related incremental data to the server; and the server creates an archive.

It should be noted that although Invention A adopts the "global timeline" mode, the "global" in the "global timeline" means that each restore point includes all the files of the project at the time; and relative to the previous restore point, only some of the files have been changed. This part of change can include all local modifications or only include some local modifications, and the latter may be more common. Therefore, the step AS06 is "optional" when the data summary files A202a are submitted. For example, if the CAD user changes 10 files, but only wants to submit 3 files, then the CAD user can select the 3 files as the items for submission. The remaining 7 files can be submitted later.

Here is a more practical example: imagining that a designer is currently managing two design tasks (or changes) in parallel, one of which has been completed, involving modifications of 3 files, and the other task is still in progress, involving modifications of 7 files. At the moment, the designer needs and only needs to submit the 3 files related to the completed task, thus a "choice" must be made first at the time of submission. The selected content includes: files that have been changed for the already completed task. The changes include: addition, modification or deletion.

Step AS07, Updating to a Restore Point

A collaborating user can update one's own CAD graph version through the update function to the latest version or to a selected restore point. The method is as follows: the timeline storage device A200 downloads the selected restore point from the server to the local computer, and updates the corresponding working snapshot. The timeline storage device A200 analyzes the information of the restore point, finds out the modified CAD graphical files, then downloads the data summary file corresponding to the CAD graphical files to the local computer, and updates the data summary file to the working snapshot.

Figure 2:
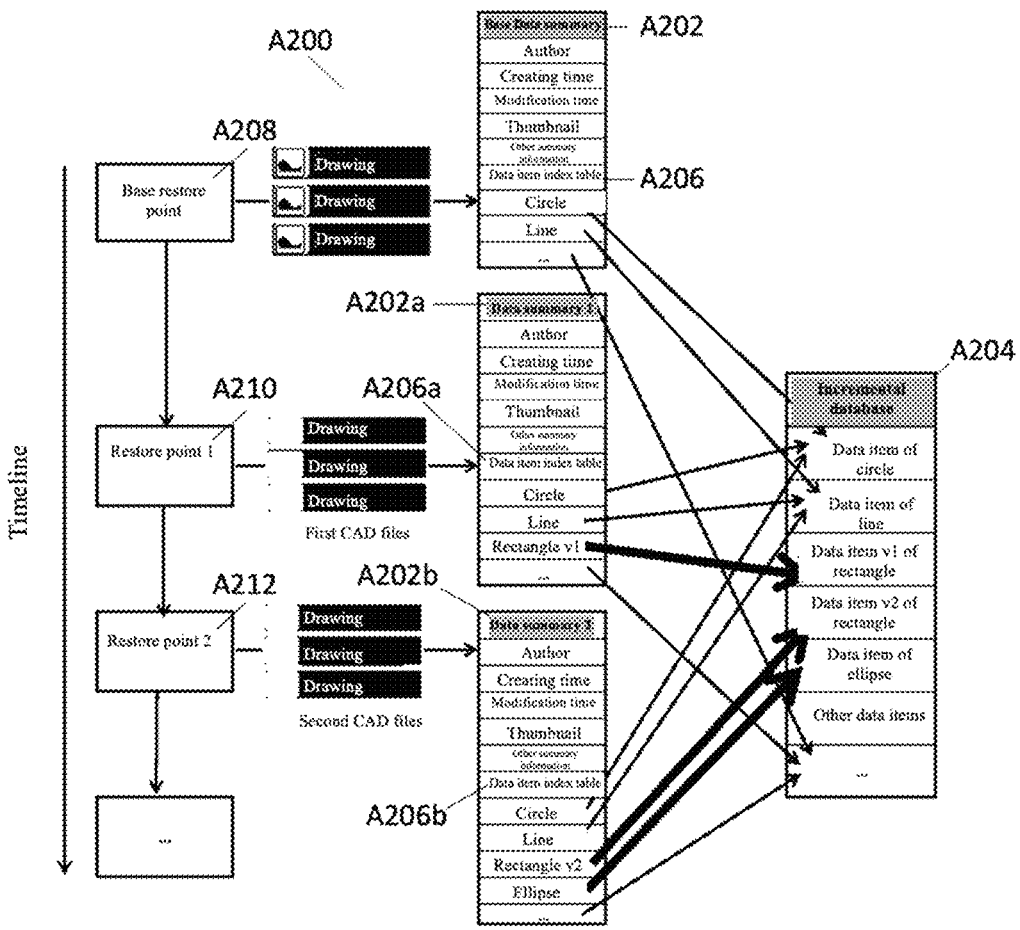
FIG. 2 is a schematic diagram of an embodiment of a timeline management method for CAD graphical data in Invention A.

Bold arrows in FIG. 2 indicate the parts with changed data.

Embodiment 2 of Invention A

In some embodiments, Invention A discloses a timeline storage device for CAD drawings, comprising: a first data summary file and an incremental database; the first data summary file comprises a first data item index table and first data summary information; the incremental database stores first data detailed information corresponding to the first data summary information; the first data item index table is operable to search the first data detailed information corresponding to the first data summary information in the incremental database; the data summary file is configured to be associated with a first restore point.

In some embodiments, Invention A also comprises: a time axis, wherein the first restore point is set on the time axis according to creating time of the first restore point. In some embodiments, the time axis comprises a plurality of restore points, and the plurality of restore points are arranged in sequence according to their respective creating time.

In some embodiments, Invention A also comprises a second data summary file comprising a second incremental data item index table and second data summary information; incremental data detailed information of the second data summary information relative to the first data summary information is stored in the incremental database; the second incremental data item index table is operable to search second data detailed information corresponding to the second data summary information in the incremental database; and the second data summary file is configured to be associated with a second restore point.

In some embodiments, the first restore point and the second restore point are arranged on the time axis in sequence according to their respective creating time. In some embodiments, the second data detailed information comprises (i) the incremental data detailed information, and (ii) part or all of the detailed information in the first data detailed information. In some embodiments, the first data summary file is saved in a full-file snapshot mode. In some embodiments, the first data summary file is generated based on one or more CAD drawings, and the one or more CAD drawings are related to a same project. In some embodiments, the first data summary information comprises one or more summary information of author information, creating time, modification time and/or thumbnails. In some embodiments, the first data detailed information is a metadata item.

Embodiment 3 of Invention A

In some embodiments, Invention A discloses a user terminal of a CAD system, comprising: a restore point acquisition module operable for acquiring first restore point from a timeline storage device; a restore point analysis module connected with the restore point acquisition module and operable for analyzing first data summary file associated with the first restore point, wherein the first data summary file comprises a first data item index table and first data summary information; a file restoration module connected with the restore point analysis module and operable for acquiring the first data item index table and the first data summary information, acquiring first data detailed information corresponding to the first data summary information from incremental database of the timeline storage device and restoring to generate a first file.

In some embodiments, Invention A also comprises: the restore point acquisition module is operable to acquire the first restore point on a time axis in the timeline storage device.

In some embodiments, the restore point acquisition module also acquires a second restore point from the timeline storage device; the restore point analysis module acquires a second data summary file through the second restore point, comprising a second incremental data item index table and second data summary information; the file restoration module acquires second data detailed information corresponding to the second data summary information from the incremental database of the timeline storage device based on the second incremental data item index table and the second data summary information, and restores to generate a second file.

In some embodiments, the second data detailed information comprises: incremental data detailed information of the second data summary information relative to the first data summary information stored in the incremental database; and part or all of the detailed information in the first data detailed information. In some embodiments, the first data summary file is saved in a full-file snapshot mode. In some embodiments, the first data summary file comprises one or more CAD drawings related to a same project. In some embodiments, the first data summary information comprises one or more summary information of author information, creating time, modification time and/or thumbnails. In some embodiments, the first data detailed information is a metadata item.

Embodiment 4 of Invention A

Figure 3A:
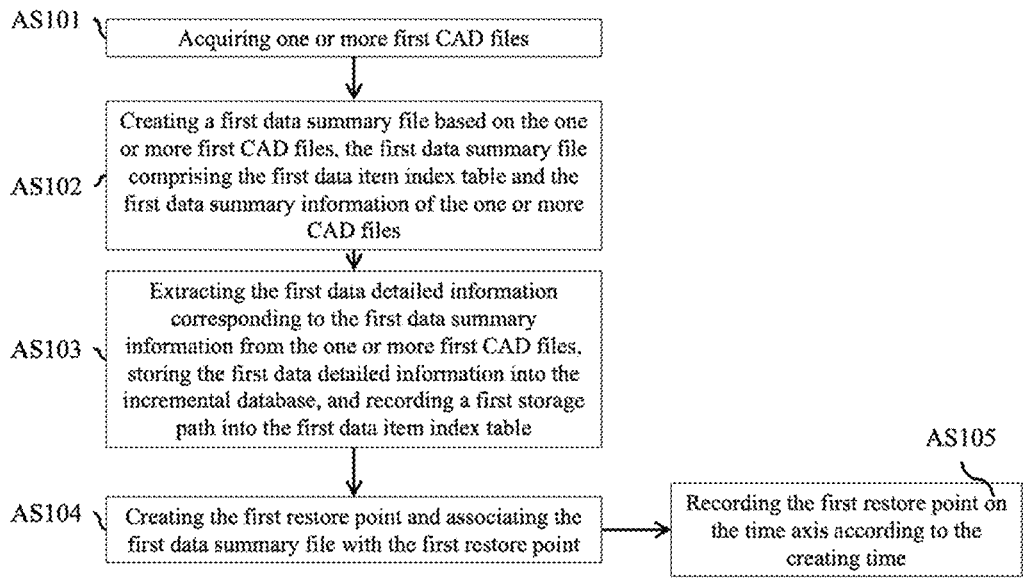
FIG. 3*a* is a flow schematic diagram of an embodiment of a timeline management method for CAD graphical data in Invention A.

In some embodiments, Invention A also discloses a management method for CAD drawings, comprising the following steps (see FIG. 3a): AS101 acquiring one or more first CAD files; AS102 creating a first data summary file based on the one or more first CAD files, the first data summary file comprising a first data item index table and first data summary information of the one or more first CAD files; AS103 extracting first data detailed information corresponding to the first data summary information from the one or more first CAD files, storing the first data detailed information into an incremental database, and recording a first storage path into the first data item index table; AS104 creating a first restore point and associating the first data summary file with the first restore point.

In some embodiments, Invention A also comprises the following step: AS105 recording the first restore point on a time axis according to creating time of the first restore point.

Figure 3B:
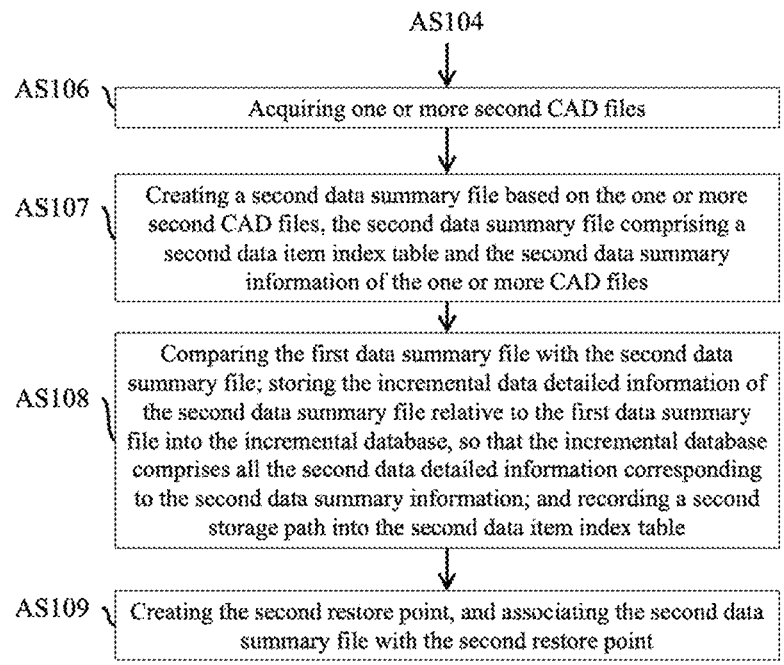
FIG. 3*b* is a flow schematic diagram of an embodiment of a timeline management method for CAD graphical data in Invention A.

In some embodiments, Invention A also comprises the following steps (see FIG. 3b): AS106 acquiring one or more second CAD files; AS107 creating a second data summary file based on the one or more second CAD files, the second data summary file comprising a second data item index table and second data summary information of the one or more CAD files; AS108 comparing the first data summary file with the second data summary file; storing the incremental data detailed information of the second data summary file relative to the first data summary file into the incremental database, so that the incremental database comprises all second data detailed information corresponding to the second data summary information; and recording a second storage path into the second data item index table; AS109 creating a second restore point, and associating the second data summary file with the second restore point.

In some embodiments, Invention A also comprises the following step: AS110 recording the second restore point on the time axis according to creating time of the second restore point. In some embodiments, the first data summary file is saved in a full-file snapshot mode. In some embodiments, the one or more first CAD files are related to a same project. In some embodiments, the first data summary information comprises one or more summary information of author information, creating time, modification time and/or thumbnails. In some embodiments, the first data detailed information is a metadata item.

Embodiment 5 of Invention A

Figure 4A:
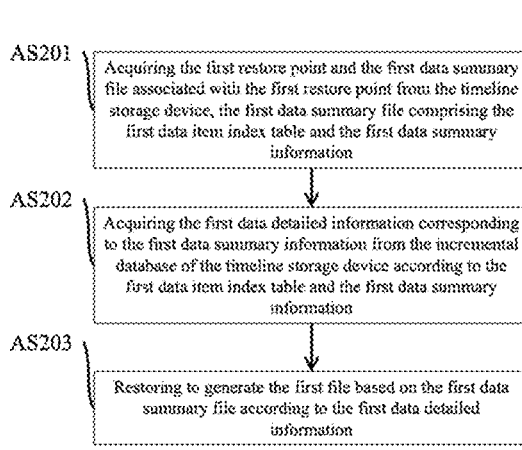
FIG. 4*a* is a flow schematic diagram of an embodiment of a timeline management method for CAD graphical data in Invention A.

In some embodiments, Invention A discloses a method for restoring CAD files, comprising the following steps (see FIG. 4a): AS201 acquiring a first restore point and a first data summary file associated with the first restore point from a timeline storage device, the first data summary file comprising a first data item index table and first data summary information; AS202 acquiring first data detailed information corresponding to the first data summary information from an incremental database of the timeline storage device according to the first data item index table and the first data summary information; AS203 restoring to generate a first file based on the first data summary file according to the first data detailed information. In some embodiments, the first restore point is recorded on a time axis of the timeline storage device.

Figure 4B:
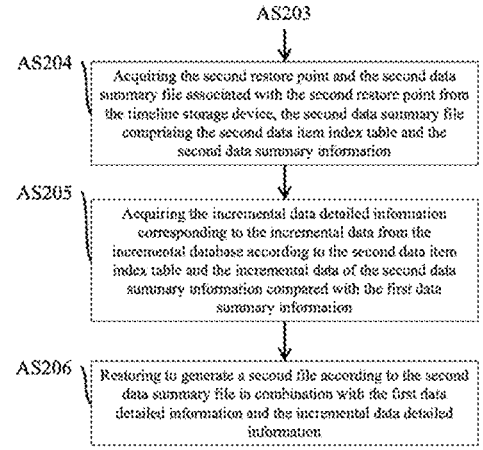
FIG. 4*b* is a flow schematic diagram of an embodiment of a timeline management method for CAD graphical data in Invention A.

In some embodiments, Invention A also comprises the following steps (FIG. 4b): AS204 acquiring a second restore point and a second data summary file associated with the second restore point from the timeline storage device, the second data summary file comprising a second data item index table and a second data summary information; AS205 acquiring incremental data detailed information from the incremental database according to the second data item index table and incremental data of the second data summary information relative to the first data summary information, wherein the incremental data detailed information corresponds to the incremental data; AS206 restoring to generate a second file according to the second data summary file in combination with the first data detailed information and the incremental data detailed information.

In some embodiments, the first data summary file is saved in a full-file snapshot mode. In some embodiments, the first data summary file is generated based on one or more CAD drawings, and the one or more CAD drawings are related to a same project. In some embodiments, the first data summary information comprises one or more summary information of author information, creating time, modification time and/or thumbnails. In some embodiments, the first data detailed information is a metadata item.

Compared with the prior art, Invention A has the following technical features:

1. The timeline information is stored in a snapshot mode (i.e., the full-file snapshot mode is used to save the data summary files), and the restore point data is stored in an incremental mode; thus, both modes are used. 2. Because Invention A uses data summary and incremental data to transmit and process CAD graphs. Therefore, Invention A does not take a full-file snapshot of the entire CAD graph. 3. Invention A analyzes the data summary files and the incremental data to trace the design changes in various restore points, rather than comparing differences based on the entire CAD graphs.

Invention A constructs the timeline by taking the entire engineering design project as a unit, rather than creating an independent timeline for each CAD graphical file in the project.

Based on the above technical features, Invention A has the following beneficial effects: 1. Invention A manages the timeline and data information of the CAD graphs through data summary and data increment, rather than a complete graphical file, thereby reducing the storage and transmission overhead of the CAD graphical data and improving the processing performance of a data line storage device. 2. Invention A uses the engineering design project as a unit to create a global timeline, rather than creating an independent timeline for each CAD graphical file in the project, so as to ensure that the graphical data of the project on each restore point is complete and consistent, making it less likely to mix old and new graphs. For example, in a design scenario wherein an electrical layout drawing takes a floor plan as reference, if two file versions obtained are not matched, the result of the drawing may be wrong. The creating mode of the timeline in Invention A can prevent such error from occurring. 3. Invention A transmits the incremental data of the CAD graphs, rather than the entire CAD graph, thereby greatly reducing the data transmission amount of the CAD graphical data and improving the transmission efficiency. 4. Invention A analyzes data summary and incremental data to trace the design changes, thereby improving the efficiency of viewing the design changes.

Specifically, Invention A creates a data summary file for the CAD graphical file, and then stores a full-file snapshot of the data summary to create a timeline. The incremental data (i.e., the different parts) generated by file modification are separately stored in the incremental database. The data summary is much smaller than the original file. In addition, the data summary also comprises all necessary information and metadata indexes to process the original file, i.e., the data summary file is complete.

Because the data summary file has the feature of being small in size, in the course of creating the timeline information by storing the full-file snapshot of the data summary, Invention A has smaller data consumption, compared with the original snapshot (Git mode). In other words, the storage space requirements and the I/O overhead of the device have been reduced. This advantage is particularly applicable for the fields of mobile devices (with small memory) and the Internet (with slow and high-cost data transmission).

The technical advantage of Invention A is illustrated by an example: a CAD design project with 100 original files is taken as an example. If the average file size is 10 MB, there are a total of 200 restore points and each restore point includes 5 modified files on average, the data size of each change in each file is 100 KB. The basis data is: (10 MB/piece*100 pieces)=1 GB. Based on the full-file snapshot mode, to store the complete timeline of the project, the required additional data amount is: (10 MB/piece*5*200) =10 GB. Invention A uses the data summary of the graphic file as a snapshot to create a restore point. The modified data (different parts) are stored separately in a corresponding incremental database. The data summary stores the index of the data item instead of the data item itself, and has a size much smaller than the original graph, which is assumed to be: $\frac{1}{10}$ (i.e., 1 MB). Based on the technical solution of Invention A, to store the complete timeline of the project, the required additional data amount is: [($\frac{1}{10}$ MB+100 KB)*5*200]=1.1 GB, which is approximately $\frac{1}{10}$ of that of the full-file snapshot mode. The smaller the size of the index item in comparison with the size of the data item, the more obvious the access advantage of Invention A will be.

In addition, because the timeline device of Invention A stores the data summary and the data summary files are complete, when an user needs to trace the design changes in versions (restore points), Invention A only needs to compare the data summary files between the two restore points to obtain the complete change information (for example, the data summary information is compared to find the incremental data summary, and then the detailed information of the incremental data corresponding to the incremental data summary is obtained from the incremental database). In other words, the user can restore the files from any restore point to another restore point only through the data summary file, which is different from Subversion which starts from the base file to sequentially merge the differences on each restore point to recover the versions of the files. It is obvious that extensive data analysis and processing are required for the recovery mode that is based merging differences. Therefore, compared with the differential timeline device, the performance and the reliability of Invention A are higher, i.e., the performance and data security of the device are improved. Moreover, the efficiency is increased and the efficiency problem in tracing the design changes is alleviated.

Invention A has a wide application field, including, but not limited to, networking storage, sharing and protection of CAD graphical data. Other application scenarios of Invention A are summarized as follows: 1. the data files satisfy the requirements of metadata. Namely, the data files can be decomposed into smaller metadata sets. 2. Invention A is used for incremental saving or reading of disk files. 3. Invention A is used for incrementally transmitting files or data in a network environment. 4. Invention A is used for backup and recovery of the data files.

The embodiments of Invention A are described above with reference to the drawings, but Invention A is not limited to the above specific embodiments. The above specific embodiments are only illustrative, not restrictive. Under the enlightenment of Invention A, those ordinary skilled in the art can make many forms without departing from the objective of Invention A and the protection scope of the claims, and these forms are protected by Invention A. For example, in the above embodiment 1, although the timeline storage device is placed in a remote server (e.g., the cloud of the CAD collaborative design system), a CAD user can create a timeline storage device in one's own local computer terminal and create a complete project timeline (which can also be called as a private timeline). The CAD user can upload the created entire private timeline to the cloud of the CAD collaborative design system for the collaborating parties to obtain CAD files on different restore points. From another perspective, although Invention A is particularly suitable for the CAD collaborative design system, Invention A can also be used in non-collaborative design projects. A CAD drawing engineer can also use Invention A to manage the CAD files of drawing points.

Invention B: A Referencing Method and Referencing Device for an External File in a CAD System, a Computer Readable Storage Medium and a Computer Terminal.

Invention B relates to a referencing method and referencing device for an external file in a CAD system, a computer readable storage medium and a computer terminal.

In the traditional CAD drawing process, a user of a profession needs to rely on drawings provided by users of other professions or other external files. Generally, the drawings provided by other engineers of other professions are introduced into one's own drawings by means of external reference to draw with reference to the floor, room, wall and other elements in the drawings. A user of a particular profession often focuses on elements of a certain aspect. The drawings of users of other professions may be too complicated for others because the drawings contain elements of other aspects. Therefore, when the drawings provided by users of other professions are introduced, filtration rules need to be set.

In the prior art, only two filtration rule types are commonly available for external reference (XREF) files in the CAD system: (i) to set a clipping region and (ii) to set a hidden layer. The types of the filtration rules are overly simplistic, and cannot perform complex and flexible operation on the introduced CAD drawings. Even if the referenced (or introduced) CAD drawings are very different, because only two filtration rule types (the clipping region is set or the hidden layer is set) are commonly available, the CAD software user can only choose between the two rule types.

In addition, in the existing CAD system, both the external referenced files and the filtration rules for the external referenced files are binary data stored in the dwg file together. Therefore, as the filtration rules are integrally combined with the CAD drawing data (i.e., the filtration rules and CAD drawing data are saved together in a strong coupling mode), the set of specific filtration rules cannot be conveniently used for other external referenced files. In addition, each referenced external referenced file may be referenced repeatedly by different users. If a specific filtration rule is set individually for each reference, the reference work will become very tedious and prone to error. In other words, in the strong coupling saving mode, the reuse rate of the filtration rules is low, and the cost of modification and maintenance is also high.

In addition, because the filtration rules are stored in the dwg drawing, any new function may cause the change of the CAD drawing file format. However, the widely transmitted file like the dwg drawing may not be modified easily. Therefore, it is difficult to extend the inherent functions, i.e., the filtration means is fixed, and the expansibility is not good.

The objective of Invention B is to provide a novel referencing mode for the CAD system to mitigate or alleviate the above shortcomings of the external reference mode in the existing CAD system to a certain extent.

To achieve the above objective, Invention B discloses a referencing method for an external file in a CAD system, comprising the following steps: creating at least one first general referencing rule file independent of a referenced file according to at least one referencing condition, and storing the first general referencing rule file independently in an extensible file format; and referencing at least one referenced file according to at least one of the first general referencing rule file selected.

Further, the first general referencing rule file is extended on the basis of a second general referencing rule file sent by a collaborating party, and the second general reference rule file is created according to at least one referencing condition selected by the collaborating party.

Further, the referencing rule file is stored in XML (Extensible Markup Language) format. Further, referencing conditions comprise a layer filtering operation instruction, a clipping region filtering operation instruction, and/or a drawing filtering operation instruction. Further, the drawing filtering operation instruction is a customized referencing condition added based on each object type and characteristic in the referenced file.

Invention B also discloses a referencing method for an external file in a CAD system, comprising the following steps: acquiring at least one third general referencing rule file sent by a collaborating party; referencing at least one referenced file according to at least one of the third general referencing rule file selected, wherein the third general referencing rule file is created in advance according to at least one referencing condition selected by the collaborating party, and is independently stored in an extensible file format.

Further, the referencing rule file is stored in XML format. Further, referencing conditions comprise a layer filtering operation instruction, a clipping region filtering operation instruction, and/or a drawing filtering operation instruction. Further, the drawing filtering operation instruction is a customized referencing condition added based on each object type and characteristic in the referenced file.

Invention B also discloses a referencing device for an external file in a CAD system, comprising: a referencing rule file creation module operable for creating at least one first general referencing rule file independent of a referenced file according to at least one referencing condition, and storing the first general referencing rule file independently in an extensible file format; a first storage module operable for storing at least one of the first general referencing rule file created by the referencing rule file creation module; and a first referencing module operable for referencing at least one of the referenced file according to at least one of the first general referencing rule file selected.

Further, the first general referencing rule file is extended by a referencing rule file creation module on the basis of a second general referencing rule file sent by a collaborating party, and the second general rule file is created according to at least one referencing condition selected by the collaborating party.

Further, the referencing rule file is stored in XML format. Further, the referencing conditions comprise a layer hiding operation instruction, a clipping region hiding operation instruction, and/or a drawing filtering operation instruction. Further, the drawing filtering operation instruction is a customized referencing condition added based on each object type and characteristic in the referenced file.

Invention B also discloses a referencing device for an external file in a CAD system, comprising: an acquisition module operable for acquiring at least one second general rule file sent by a collaborating party; a second referencing module operable for referencing at least one referenced file according to at least one of the second general referencing rule file selected, wherein the second general referencing rule file is created in advance according to at least one referencing condition added by the collaborating party, and is independently stored in an extensible file format.

Further, the referencing rule file is stored in XML format. Further, referencing conditions comprise a layer hiding operation instruction, a clipping region operation instruction, and/or a drawing filtering operation instruction. Further, the drawing filtering operation instruction is a customized referencing condition added based on each element type and characteristic in the referenced file.

Invention B also discloses a computer readable storage medium, comprising a group of instructions, wherein when the instructions are being executed, at least one processor performs the following operations: creating at least one first general referencing rule file independent of a referenced file according to at least one referencing condition, and storing the first general referencing rule file independently in an extensible format; referencing at least one of the referenced file according to at least one of the first general referencing rule file selected; or, when the instructions are being executed, at least one processor performs the following operations: acquiring at least one third general referencing rule file sent by a collaborating party; referencing at least one of the referenced file according to at least one of the third general referencing rule file selected; wherein the third general referencing rule file is created in advance according to at least one referencing condition selected by the collaborating party, and is independently stored in an extensible file format.

Further, the first general referencing rule file is extended on the basis of a second general referencing rule file sent by a collaborating party, and the second general reference rule file is created according to at least one referencing condition selected by the collaborating party.

Invention B also discloses a computer terminal, comprising at least one processor, and the computer readable storage medium coupled to the processor, wherein when the instructions are executed, at least one processor performs the following operations: creating at least one first general referencing rule file independent of a referenced file according to at least one referencing condition, and storing the first general referencing rule file independently in an extensible format; referencing at least one of the referenced file according to at least one of the first general referencing rule file selected; or when the instructions are being executed by at least one processor, at least one processor performs the following operations: acquiring at least one third general referencing rule file sent by a collaborating party; referencing at least one referenced file according to at least one of the third general referencing rule file selected; wherein the third general referencing rule file is created in advance according to at least one referencing condition selected by the collaborating party, and is independently stored in an extensible file format.

Further, the first general referencing rule file is extended on the basis of a second general referencing rule file sent by a collaborating party, and the second general reference rule file is created according to at least one referencing condition selected by the collaborating party.

The beneficial technical effects of Invention B: Invention B generates at least one referencing rule file independent of the referenced file according to the referencing conditions, so that when the referenced file is introduced, any referencing rule file (which can be created by the CAD drawing engineer or obtained from other collaborating parties) that meets the actual needs can be designated without the need to repeatedly set the referencing conditions, thereby greatly improving the working efficiency and better ensuring the referencing correctness (e.g., avoiding errors which might occur in the repeat setting of the referencing conditions). In addition, Invention B uses an extensible file format to store the referencing rule files, such as XML format, so that the referencing rule files are independent of the referenced files and expandable, so as to create new referencing conditions according to the actual needs.

To make the objective, the technical solution and advantages of the embodiments of Invention B clearer, the technical solution in the embodiments of Invention B will be clearly and fully described below in combination with the drawings in the embodiments of Invention B. Apparently, the described embodiments are part of the embodiments of Invention B, not all of the embodiments. Based on the embodiments in Invention B, all other embodiments obtained by those ordinary skilled in the art without contributing creative labor will belong to the protection scope of Invention B.

Embodiment 1 of Invention B

Figure 5A:
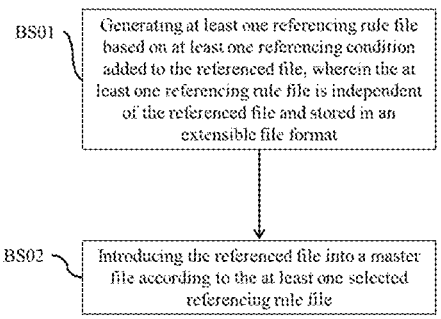
FIG. 5*a* is a flow chart of an embodiment of a referencing method for an external file in a CAD system in Invention B.

In some embodiments of Invention B, a referencing method for an external file in a CAD system comprises the following steps (FIG. 5a):

Step BS01: generating at least one referencing rule file based on at least one referencing condition added to the referenced file, wherein the at least one referencing rule file is independent of the referenced file and stored in an extensible file format.

Step BS02: introducing the referenced file into a master file according to the at least one selected referencing rule file.

Figure 5B:
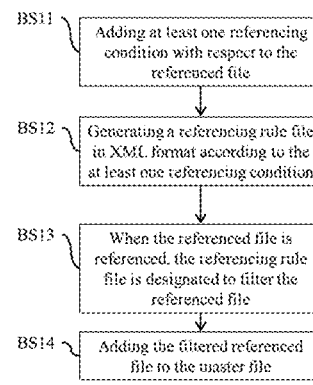
FIG. 5*b* is a flow chart of another embodiment of a referencing method for an external file in a CAD system in Invention B.

In some embodiments of Invention B, a referencing method for an external file in a CAD system comprises the following steps (FIG. 5b):

Step BS11: adding at least one referencing condition with respect to the referenced file;

Step BS12: generating a referencing rule file in XML format according to the at least one referencing condition;

Step BS13: when the referenced file is referenced, the referencing rule file is designated to filter the referenced file;

Step BS14: adding the filtered referenced file to the master file.

The referencing method for the external file disclosed in the above embodiments is of great significance for CAD collaborative drawing: more and more CAD drawing projects are completed by multiple professional engineers in collaboration. Therefore, the process of mutual collaboration often involves the cross-reference/cross-referencing of CAD files from different professions (herein, the referenced and cited files are called "referenced files"; and the CAD drawing which receives and incorporates the "referenced files" is called the "master file"). When the master file references/cites the referenced file, the user can add the referencing conditions related to the referenced file (filter the elements in the referenced file). The referencing condition can be a referencing condition which has already been associated with the referenced file (for example, the current user or other users have previously set one or more referencing conditions for the referenced file), or can be a newly added referencing condition, or can be a modification to the previously set referencing condition.

In some embodiments, the above referencing conditions are stored separately to form referencing rule files, and the referencing rule files are independent of the referenced file and independent of the master file. In some embodiments, "independent" means that the referencing rule files can be created, saved, modified, updated, and transmitted separately—for example, a water supply and drainage engineer can share the referencing rule file created by the water supply and drainage engineer with another water supply and drainage engineer without sharing the referenced CAD files.

The referencing rule files may be in an extensible file format; for example, the referencing rule files may be stored in an XML format. XML is a simple, platform-irrelevant and widely used standard language as well as a "metalanguage" used to define other languages. In brief, XML provides a method for describing structured data. XML is also a meta-markup language, which defines a syntactic language for defining other semantic and structured markup languages related to a specific field. The user can define required marks, which is the extensibility of the language. In the XML file, the content and the presentation form are separated, which allows different users to define different referencing conditions according to their own needs.

Besides XML, other extensible file formats and markup languages are also applicable to Invention B to store the referencing rule files, such as GML (Generalized Markup Language), SGML (The Standard Generalized Markup Language), HTML (HyperText Markup Language), XHTML (Extensible HyperText Markup Language), XAML (Extensible Application Markup Language) and JSON (JavaScript Object Notation).

Therefore, compared with the traditional CAD software system, the external reference in the prior art only records one external dwg file path name. Besides recording the dwg file, Invention B additionally records a referencing rule file independent of the external dwg file. When an external dwg file is referenced, the referencing rule file is opened. The entities (also called graphic primitives and graphic elements), objects, blocks, groups and/or layers which conform to the rule in the dwg file are loaded according to the referencing conditions recorded in the referencing rule files.

In some embodiments of Invention B, the referencing rule files can adopt three referencing rule modes: layer display, region clipping and graphic filtering. Each mode records corresponding feature information according to its respective characteristics. In other embodiments of Invention B, the mode of referencing rules includes, but is not limited to, filtering, replacing and adding.

Taking region clipping as an example, such a referencing rule specifies that only entities in a certain region can be displayed. Therefore, the referencing rule records a set of a series of two-dimensional points and a coordinate transformation matrix. After the CAD drawing system software reads the referencing rule, it will decide whether the boundaries of the entities fall within the certain region, and the entities that are not within the certain region will not be displayed.

An embodiment of a referencing rule file is provided below, which shows three referencing rule modes: layer display, region clipping and graphic filtering in XML format:

```
▼<DwxRuleFile Version="1">
   <Base>MECH/Pipeline.dwx</Base>
   ▼<Layer Version="1">
      <Layer Version="1"> Section line </Layer>
   </Layers>
   ▼<RservedArea Version"1">
      <Point Version="1" X="-1876.75157479476"
         Y="1027.552244589909" Z="0"/>
      <Point Version="1" X="-9.2558518750343" Y="-
         1948.62892676805" Z="0"/>
   </ReservedArea>
   ▼<Filters Version="1">
      ▼<Filter Version="1" PType="2">
         <Type> Circle </Type>
         <rxType>AcDbCircle</rxType>
         <id>1302</id>
         <Element>-1</Element>
         <Display> Color </Display>
         <Operator>0</Operator>
         <DisplayValue>BYLAYER</DisplayValue>
         <Value>-1073741824;;</Value>
      </Filter>
   </Filters>
</DwxRuleFile>
```

Firstly, in the node Layers, the filtered layer name "section line" is recorded. If the referenced drawing contains a layer with the name "section line", then the entities on the layer will not be introduced.

Secondly, the point position information of the reserved region is recorded in the node ReservedArea. All entities outside the reserved region in the referenced drawing will not be introduced.

Thirdly, the conditions used in filtering the graph are recorded under the node Filters, and each condition is a Filter node. A specific Filter exists here, which means that for the entity (circle) of type AcDbCircle, when the value of the attribute (color) with number 1302 is equal to (Operator is 0) −1073741824 (i.e., BYLAYER), the entity will not be introduced.

In the traditional CAD, the clipping region and the hidden layer data set for the external reference are stored in the dwg drawing. Any addition of new functions may lead to the change of the drawing file format. A widespread file such as dwg drawing will not be easily modified. Thus, it is difficult to extend the inherent functions.

In addition, the management and transmission of the traditional CAD drawings are strongly dependent on the personal qualities of personnel. Dividing a drawing into multiple files may easily lead to the loss or confusion of the files. Therefore, the traditional CAD stores the data which is set for the external reference into dwg drawing.

However, Invention B stores all dwg drawing files and XML referencing rule files into the same CAD collaborative software system, and archives the files in the CAD collaborative software system. Because the CAD collaborative software system regulates the use of dwg drawing files and the XML referencing rule files for the users, the management of the files can be tracked with historical records, and the transmission of the files can be extended with project management. Therefore, Invention B adopts the technical solution of independent referencing rule files, which are not affected by human errors for file management.

Embodiment 2 of Invention B

Figure 6:
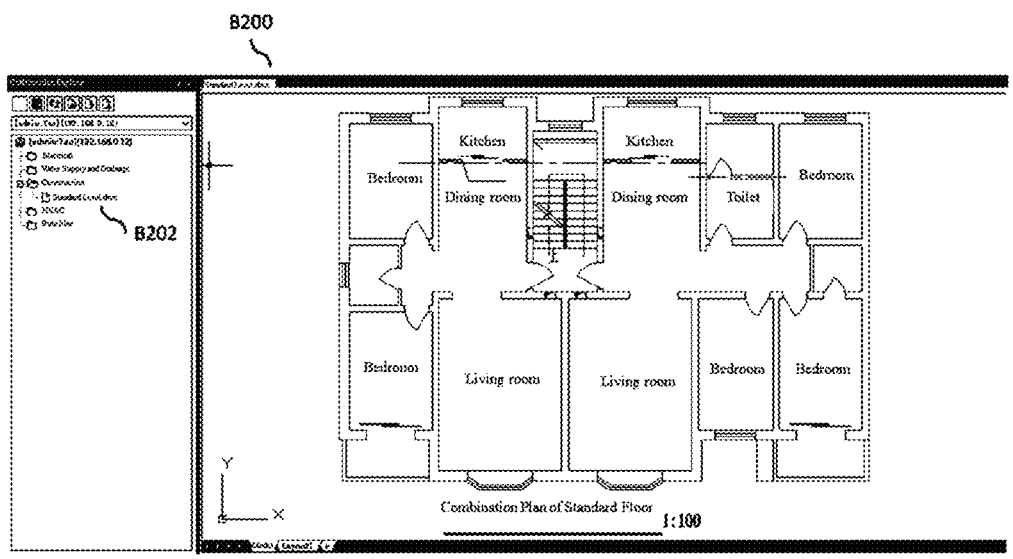
FIG. 6 is an example of a planar diagram of a standard level combination in a CAD system in Invention B.

The working mode of Invention B is illustrated with examples. In the project B200, the upstream profession is construction, and the downstream profession is water supply and drainage. Engineers in the water supply and drainage profession need to make a water supply and drainage design for a toilet and a kitchen in the drawing provided by the construction profession (for the convenience of demonstration, pipeline design is not shown in the following example, and a handwashing platform and a cooking bench are used as substitutes). A drawing "standard level.dwx" B202 is present in the construction. The drawing only has construction information, including room layout, room functions, etc. (for example, dining room, kitchen, living room, bedroom, toilet and stairwell), as shown in FIG. 6.

Figure 7:
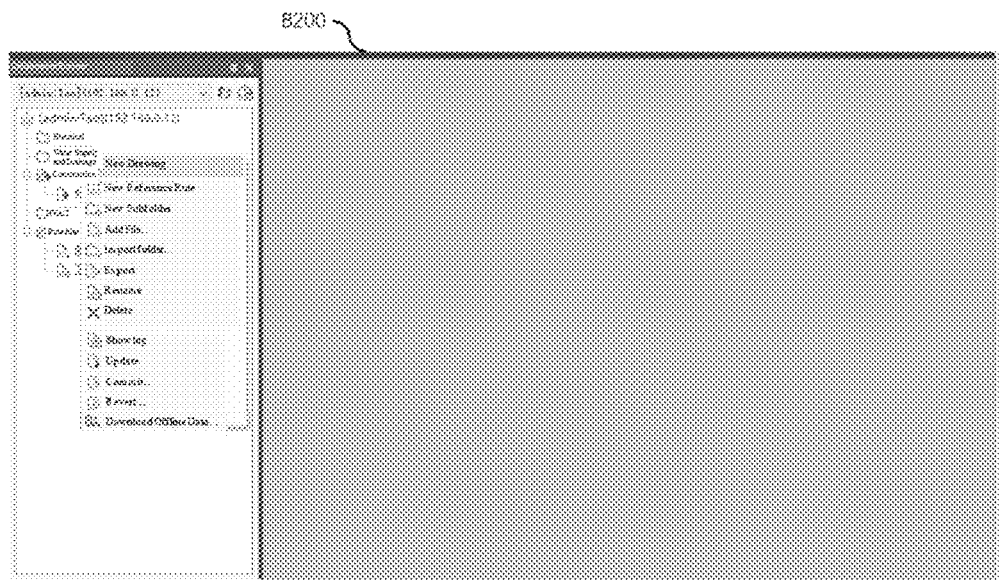
FIG. 7 is an example of creating a drawing in a CAD system in Invention B.
Figure 8:
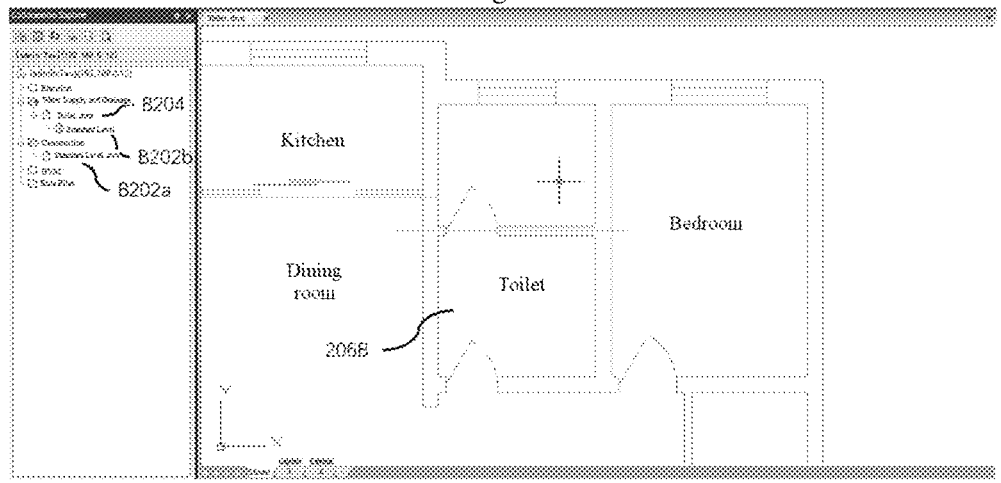
FIG. 8 is an example of introducing a drawing into a CAD system in Invention B.
Figure 9:
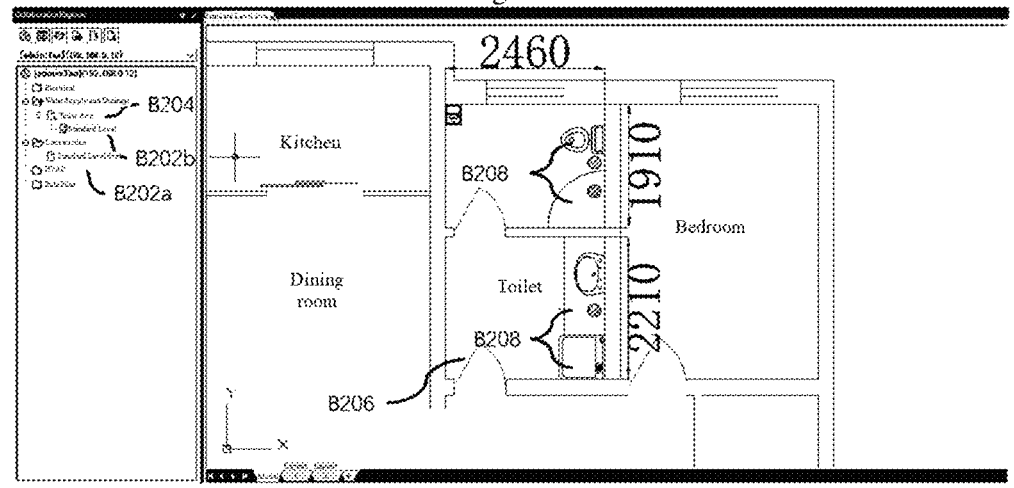
FIG. 9 is an example of drawing an entity in a CAD system in Invention B.

When drawing a water supply and drainage graph, the water supply and drainage engineer firstly creates a "toilet.dwx" drawing B204 (as shown in FIG. 7, "New Drawing") under a first-level catalog (electrical, water supply and drainage, construction, HVAC and referencing rules are in the first-level catalog) and introduces a drawing "standard level.dwx" B202 (as shown in FIG. 8—for the convenience of differentiation, a standard level under the construction is numbered as B202a and a standard level referenced under the toilet drawing is numbered as B202b). The position B206 of the toilet is located to draw the entity B208 in the position (as shown in FIG. 9), after which the drawing is saved and closed.

Figure 10:
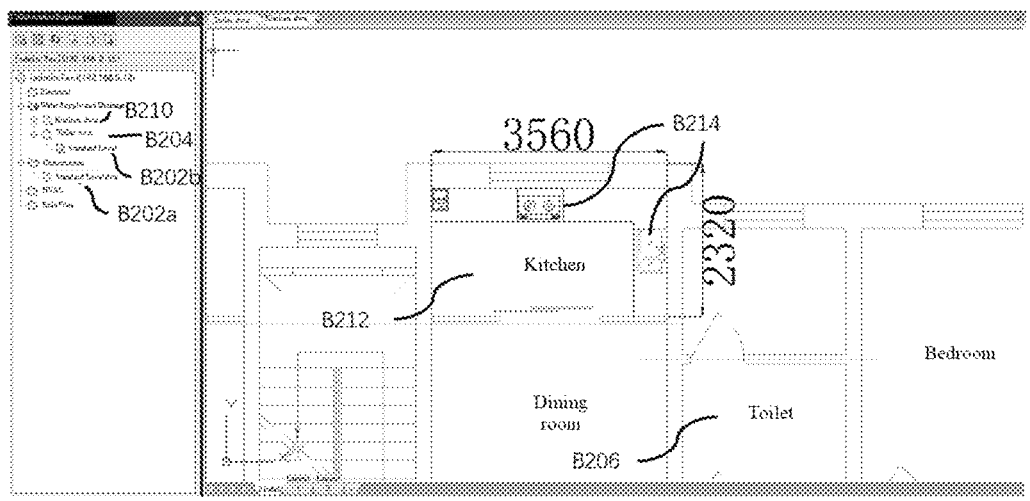
FIG. 10 is an example of drawing an entity in a CAD system in Invention B.

In the water supply and drainage drawing catalog, a drawing of "kitchen.dwx" B210 is created and the drawing "standard level.dwx" B202 is introduced. The position B212 of the kitchen is located to draw the entity B214 in the position (as shown in FIG. 10), after which the drawing is saved and closed.

The next step is to make a general drawing. Because the "standard level.dwx" B202 has annotation information, the annotation information attached from "standard level.dwx" B202 in the water supply and drainage drawing needs to be deleted.

Figure 11:
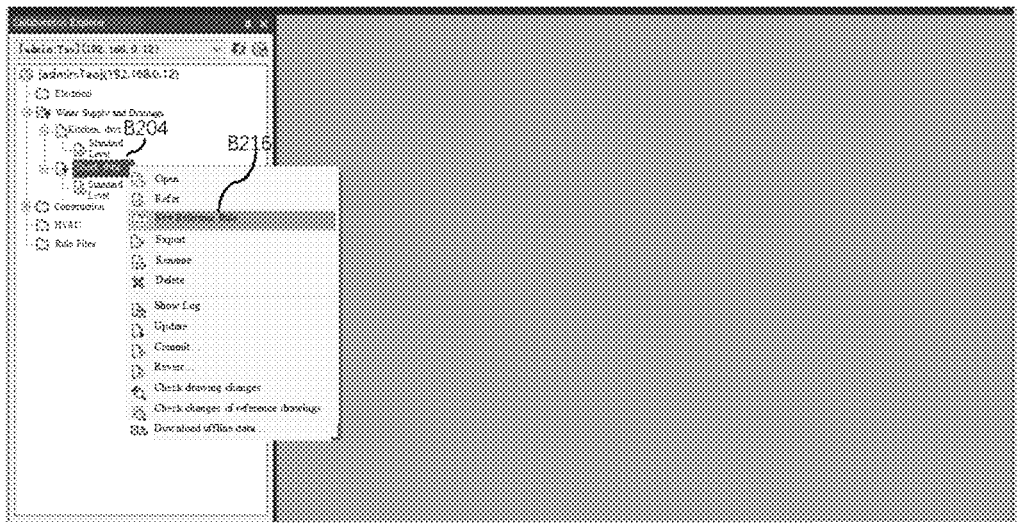
FIG. 11 is an example of creating a referencing rule in a CAD system in Invention B.
Figure 12:
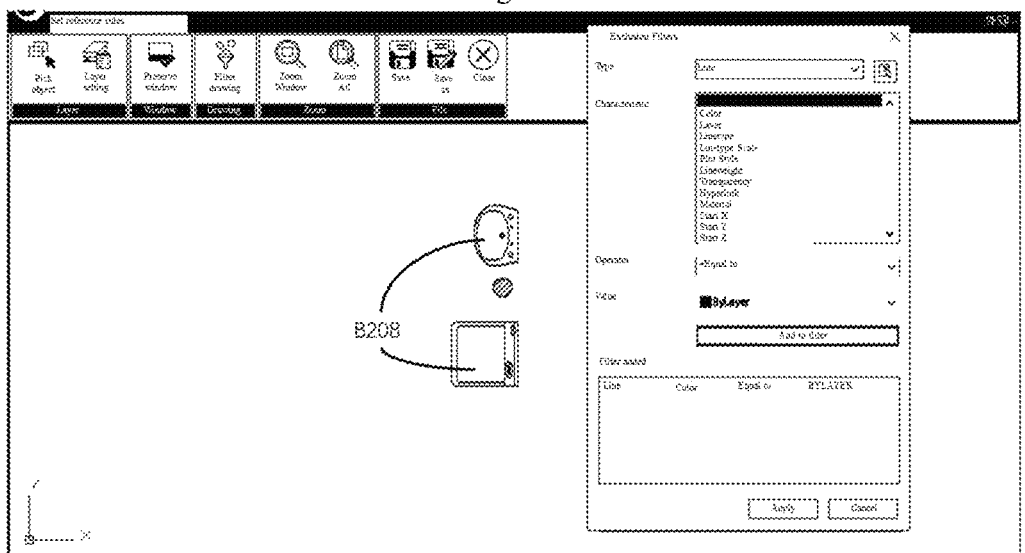
FIG. 12 is an example of setting and saving a referencing rule file in a CAD system in Invention B.

Firstly, a universal referencing rule file B216 is created to filter the annotation information attached from "standard level.dwx" B202 in the water supply and drainage drawing, and only retain those useful entities (such as sink and toilet) B208 and B214. For example, by taking "toilet.dwx" B204 as a base drawing, the file is selected to click the right button to select "New Referencing Rule" B216 from the pop-up menu (as shown in FIG. 11). "Filter Graphs" is clicked to set reasonable parameters in the "Select Excluded Objects" dialog box; all the annotations are removed to retain only the water supply and drainage entities (such as sink and. toilet); and the file "water supply and drainage.drf" B218 is saved (as shown in FIG. 12).

Figure 13:
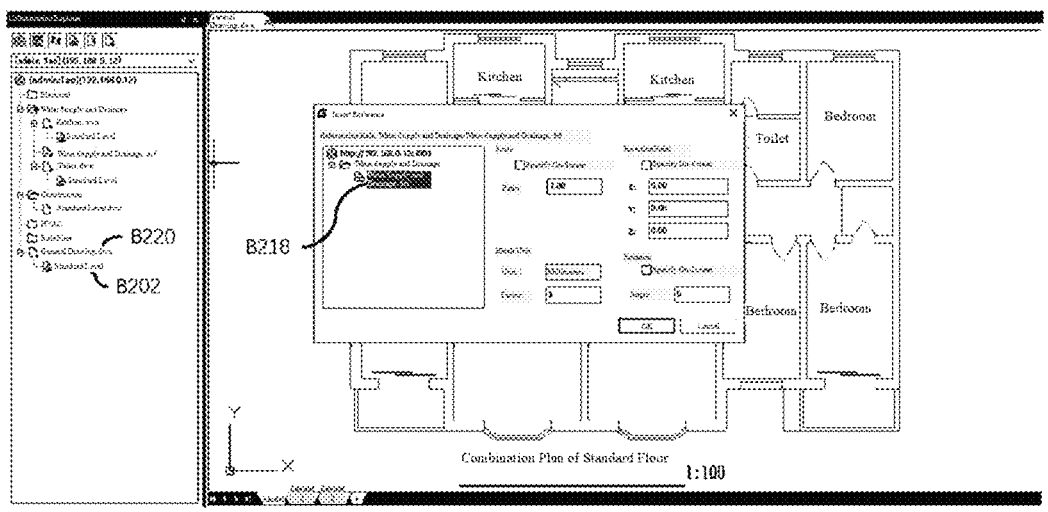
FIG. 13 is an example of importing a referenced file and a referencing rule file in a CAD system in Invention B.
Figure 14:
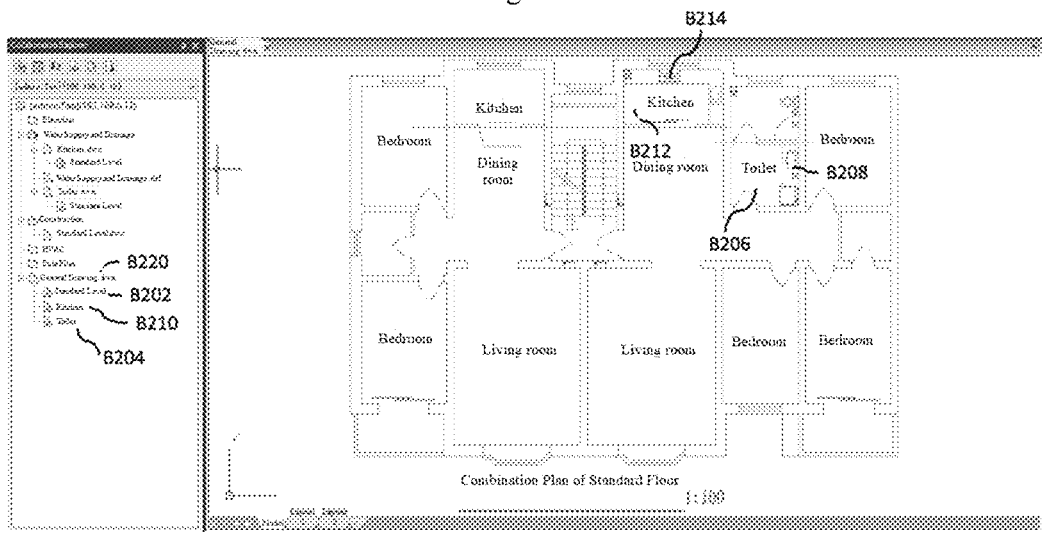
FIG. 14 is an example of adding a filtering rule in a CAD system in Invention B.

A "general drawing.dwx" B220 is created; "standard level.dwx" B202 is introduced; and then "toilet.dwx" B204 and "kitchen.dwx" B210 are introduced. When the last two files are referenced, the referencing rule "water supply and drainage.drf" B218 is designated, as shown in FIG. 13. FIG. 14 shows that in accordance with the referencing rule file "water supply and drainage.drf" B218, "general drawing.dwx" B220 only retains useful water supply and drainage entities (such as sink and toilet) in the introduced "toilet.dwx" B204 and "kitchen.dwx" B210, and deletes other annotation information attached from "standard level.dwx" B202 in the water supply and drainage drawing.

In some embodiments of the referencing method for the external file in the CAD graphical system of Invention B, the referencing rule file is an XML file, which is extensible, easy to save and transmit, and independent of the drawing file. When the drawing is referenced, any referencing rule file can be designated without repeatedly setting the referencing rules, which greatly improves the working efficiency, ensures the correctness, eliminates the limitation of the external reference function of CAD, and avoids affecting the original drawing file.

The referencing rule file is in XML format considering that the XML format naturally has reliability and extensibility and the technology for analyzing and generating the files in XML format is already mature and has low maintenance cost. However, because the rule files in Invention B are independent, any other file format can also be used, which is not limited to the XML format.

Embodiment 3 of Invention B

Based on the referencing method for the external file in the CAD system in the above embodiment 1, Invention B also provides a referencing device B300 for the external file in the CAD system, which is illustrated below in combination with the specific drawing and embodiment.

Figure 15:
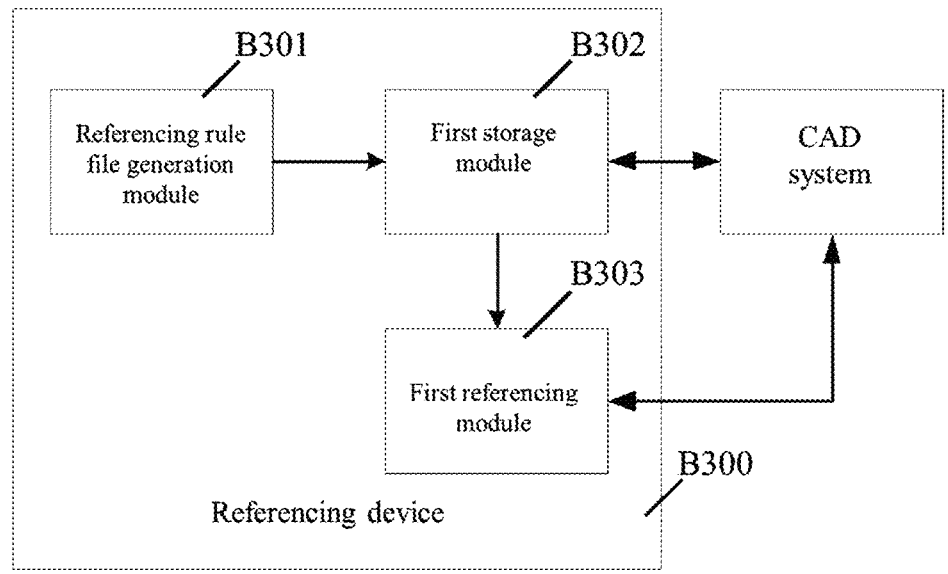
FIG. 15 is a functional module diagram of an embodiment of a referencing device for an external file in a CAD system in Invention B.

FIG. 15 is a functional module diagram of an embodiment of a referencing device for an external file in a CAD system in Invention B. Specifically, the referencing device B300 for the external file in the present embodiment comprises:

a referencing rule file generation module B301 operable to be used for generating at least one referencing rule file independent of the referenced file according to at least one referencing condition added by the referenced file, and storing the referencing rule file independent of the referenced file in an extensible format; a first storage module B302 operable to be used for storing the referencing rule file generated by the referencing rule file generation module B301; and a first referencing module B303 operable to be used for referencing a corresponding referenced file according to the selected referencing rule file.

Because one CAD drawing project is usually completed by mutual collaboration of engineers from multiple professions and a user of a profession needs to view different objects in the referenced file, once the current user introduces a referenced file (specifically, other CAD drawings are introduced by external reference, or external files such as blocks, Excel tables or pictures are introduced by inserting or other modes), then the current user may add at least one referencing condition to the referenced file according to one's own actual needs (specifically, the referencing conditions include a layer hiding operation instruction, a clipping region operation instruction, and/or a drawing filtering operation instruction) to complete the reference to the referenced file, e.g., hiding some objects in the referenced file (such as hiding the annotation information related to the infrastructure), or changing the characteristics of some objects (such as color change or line width adjustments).

However, in order to avoid storing at least one referencing condition added by the current user together with the referenced file, in the present embodiment, at least one referencing condition added to the referenced file is stored separately to be independent of the referenced file, i.e., the referencing rule file generation module B301 obtains at least one referencing condition added for the referenced file by the current user, generates at least one referencing rule file according to the at least one referencing condition, and stores the referencing rule file into the above first storage module B302 in an extensible file format to be independent of the referenced file.

Figure 20:
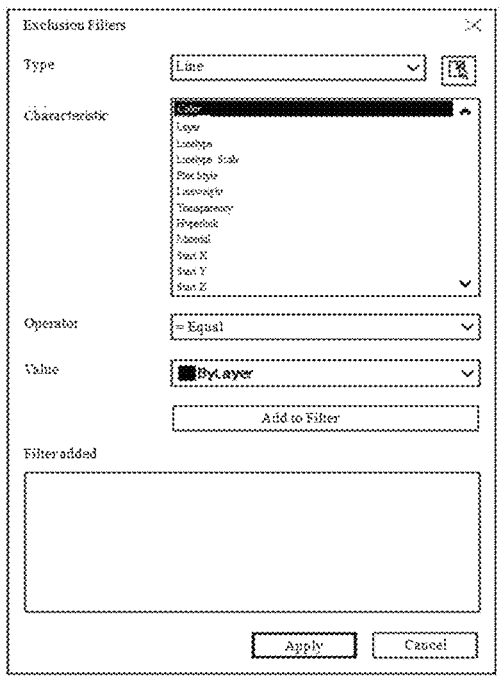
FIG. 20 is a schematic diagram of an embodiment reflecting a user-customized referencing condition in a referencing method for an external file in a CAD system in Invention B.

In a specific embodiment, the drawing filtering operation instruction is a customized referencing condition added based on each element type and characteristic in the referenced file (as shown in FIG. 20), i.e., the user selects the objects in the referenced file that need to be hidden (i.e., filtered) or need to change the referencing mode according to actual needs, and then selects the corresponding referencing mode, for example, selects an entity, and then chooses to change the color of the entity to red; or, selects an entity, and then chooses to hide the entity; or, selects an entity, then hides all elements except the entity, and only shows the entity. Specifically, the objects include various elements contained in the referenced file, with various types, such as wall, cooking bench, sink, corporate logo, tabulation instructions and other entities in a CAD drawing "kitchen.dwx", as well as annotations such as dimensions, models, or functions; of course, other types can also be included.

In a specific embodiment, the storage module B302 is only used for storing the referencing rule file generated by the referencing rule file generation module B301, and the referencing rule file is stored in an XML format.

In the present embodiment, the referenced file may be associated with at least one referencing rule file in advance, and of course may also be not associated with any referencing rule file in advance. Therefore, in another specific embodiment, the storage module B302 is used for not only storing the referencing rule file generated by the referencing rule file generation module B301, but also storing at least one referencing rule file, which is set by other users, associated with the referenced file in advance and introduced at the same time as the referenced file. Of course, furthermore, the storage module B302 can also be used for storing the referenced file, but the referenced file and the referencing rule file are stored in partitions to ensure independent storage of the two files.

In a specific embodiment, once the current user selects a referencing rule file, the referencing module B303 references the corresponding referenced file according to the selected referencing rule file. The selected referencing rule file may be generated by the referencing rule file generation module B301 according to the referencing conditions added by the current user, or generated in advance by the referencing rule file generation module of the corresponding devices of other users according to the referencing conditions added by other users, and introduced by the current user into the referenced file through the CAD system.

The referencing device of the present embodiment can also be integrated into the CAD system, that is, as a sub-function application program of the CAD system.

Embodiment 4 of Invention B

Invention B also provides another referencing method for an external file in a CAD system, which will be described in detail below with reference to specific embodiments and drawings.

Figure 16:
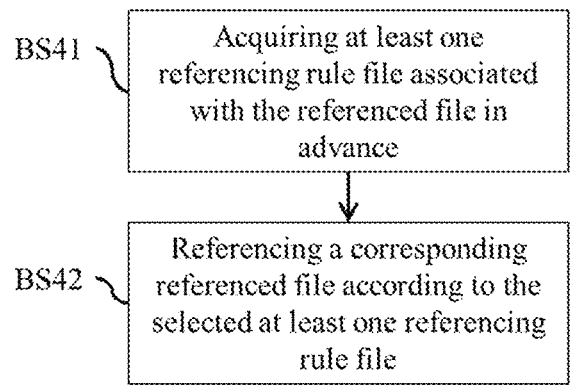
FIG. 16 is a flow chart of another embodiment of a referencing method for an external file in a CAD system in Invention B.

FIG. 16 is a flow chart of another embodiment of a referencing method for an external file in a CAD system in Invention B. Specifically, the referencing method in the present embodiment comprises the steps:

BS41, at least one referencing rule file associated with the referenced file in advance is acquired.

Because one project is generally completed by mutual collaboration of multiple professions, in the actual process, the current user generally introduces a referenced file, and the referenced file has been associated with at least one referencing rule file in advance. As a result, when the current user introduces the referenced file, the referencing rule file associated with the referenced file may also be introduced at the same time.

In a specific embodiment, the at least one referencing rule file associated with the referenced file in advance is generated in advance according to at least one referencing condition added to the referenced file by other users, and stored independent of the referenced file in an extensible file format. Specifically, the referencing rule file is stored in XML format, and when the current user introduces the referenced file, the referencing rule file associated with the referenced file will also be introduced at the same time.

In a specific embodiment, the referenced file can be other CAD drawings introduced by external reference, or can be an external file such as block, Excel table or picture introduced by inserting or other modes. The referencing conditions include a layer hiding operation instruction, a clipping region operation instruction, and a drawing filtering operation instruction, wherein the drawing filtering operation instruction is a customized referencing condition added based on each element type and characteristic in the referenced file (FIG. 20).

In a specific embodiment, the referencing conditions include the layer hiding operation instruction, the clipping region operation instruction, and/or the drawing filtering operation instruction. The drawing filtering operation instruction is a customized referencing condition added based on each element type and characteristic in the referenced file (as shown in FIG. 20), i.e., the user selects the objects in the referenced file that need to be hidden (i.e., filtered) or need to change the referencing mode according to actual needs, and then selects the corresponding referencing mode, for example, selects an entity, and then chooses to change the color of the entity to red; or, selects an entity, and then chooses to hide the entity; or, selects an entity, then hides all elements except the entity, and only shows the entity. Specifically, the objects include various elements contained in the referenced file, with various types, such as wall, cooking bench, sink, corporate logo, tabulation instructions and other entities in a CAD drawing "kitchen.dwx", as well as annotations such as dimensions, models, or functions; of course, other types can also be included.

BS42, a corresponding referenced file is referenced according to the selected at least one referencing rule file.

Generally, if no special need is proposed, sometimes the current user can directly apply at least one referencing rule file associated with the referenced file in advance without adding new referencing conditions, to form a new referencing rule file. Therefore, in the present embodiment, once the current user selects at least one referencing rule file associated with the referenced file in advance, the referenced file can be referenced directly according to the selected referencing rule file.

Embodiment 5 of Invention B

Based on the referencing method in embodiment 4, Invention B also provides a referencing device for the external file in the CAD system, which is illustrated below in combination with the specific drawing and embodiment.

Figure 17:
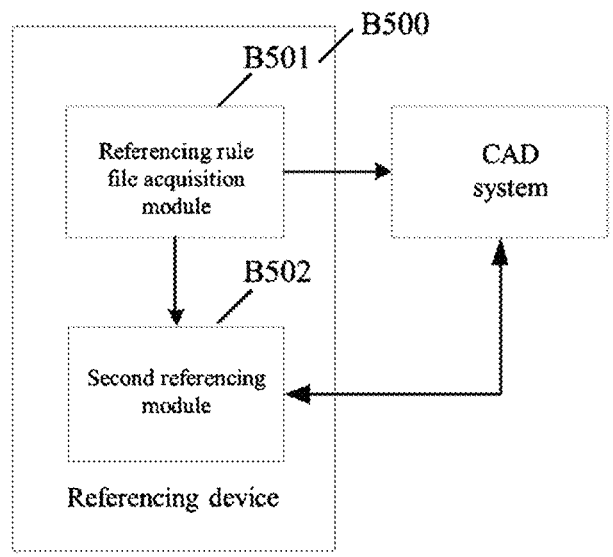
FIG. 17 is a functional module diagram of another embodiment of a referencing device for an external file in a CAD system in Invention B.

FIG. 17 is a functional module diagram of another embodiment of a referencing device for an external file in a CAD system in Invention B. Specifically, the referencing device B500 for the external file in the present embodiment comprises:

a referencing rule file acquisition module B501 for acquiring at least one referencing rule file associated with the referenced file; and a second referencing module B502 for referencing the referenced file according to the selected at least one referencing rule file.

Because one project is generally completed by mutual collaboration of multiple professions, in the actual process, the current user generally introduces a referenced file through the CAD system, and the referenced file has been associated with at least one referencing rule file in advance. Namely, when the current user introduces the referenced file, the referencing rule file associated with the referenced file in advance may also be introduced at the same time and stored into the CAD system. Therefore, when the current user introduces a referenced file, the referencing rule file acquisition module B501 is used for acquiring the referencing rule file associated with the referenced file in advance; and when the current user selects the corresponding referencing rule file through the corresponding operation, the second referencing module B502 references the referenced file according to the selected referencing rule file.

In a specific embodiment, the referencing rule file is generated in advance according to at least one referencing condition added to the referenced file by other users, and stored independently of the referenced file in an extensible file format. Specifically, the referencing rule file is stored in XML format.

In a specific embodiment, the referenced file can be other CAD drawings introduced by external reference, or can be an external file such as block, Excel table or picture introduced by inserting or other modes. The referencing conditions include a layer hiding operation instruction, a clipping region operation instruction, and a drawing filtering operation instruction, wherein the drawing filtering operation instruction is a customized referencing condition added based on each element type and characteristic in the referenced file (FIG. 20).

In a specific embodiment, the referencing conditions include the layer hiding operation instruction, the clipping region operation instruction, and/or the drawing filtering operation instruction. The drawing filtering operation instruction is a customized referencing condition added based on each element type and characteristic in the referenced file (as shown in FIG. 20), i.e., the user selects the objects in the referenced file that need to be hidden (i.e., filtered) or need to change the referencing mode according to actual needs, and then selects the corresponding referencing mode, for example, selects an entity, and then chooses to change the color of the entity to red; or, selects an entity, and then chooses to hide the entity; or, selects an entity, then hides all elements except the entity, and only shows the entity. Specifically, the objects include various elements contained in the referenced file, with various types, such as wall, cooking bench, sink, corporate logo, tabulation instructions and other entities in a CAD drawing "kitchen.dwx", as well as annotations such as dimensions, models, or functions; of course, other types can also be included.

The storage module in the present embodiment and the storage module in the above embodiment 3 may be the same storage medium or different storage media. Correspondingly, the referencing module in the present embodiment is the same as the referencing module in the above embodiment 3.

Of course, the referencing device in the present embodiment can also be integrated into the CAD system, that is, as a sub-function application program of the CAD system.

Embodiment 6 of Invention B

Invention B also provides a computer readable storage medium. In the present embodiment, the computer readable storage medium may be an RAM, a flash memory, an ROM, an EPROM, an EEPROM, a register, a hard disk, a mobile hard disk, a CD-ROM or any other form of storage medium known in the art.

The computer readable storage medium stores one or more programs, and the one or more programs can be executed by one or more processors to achieve part or all of the steps in the above embodiment 1 or the above embodiment 3.

The computer readable storage medium in the present embodiment stores one or more external file referencing programs to generate at least one referencing rule file according to the referencing rule file added to the referenced file and store the referencing rule file independent of the referenced file in an extensible file format. Compared with the traditional mode of storing the referencing rules into the dwg drawing file in the form of binary data and closely combining with the drawing data, in the present embodiment, when the referenced file is introduced, any referencing rule file can be designated according to actual needs without repeatedly setting the referencing conditions, thereby greatly improving the working efficiency and ensuring the correctness. Further, because the referencing rule file is independent of the referenced file, in addition to the traditional layer filtering mode and the clipping region filtering mode, a referencing mode for graphic filtering can be added, so as to quickly select the objects to be filtered and the filtering mode according to the object types and characteristics in the drawing.

Embodiment 7 of Invention B

The above embodiments of Invention B are achieved based on a computer terminal B600 which can be implemented in various forms, such as mobile computer terminals such as mobile phones, tablet personal computers, laptops and palmtop computers, and fixed computer terminals such as digital TVs and desktop computers. The present embodiment is described with a desktop computer as an example. Those skilled in the art will understand that the construction according to the embodiment of Invention B can also be applied to a mobile computer terminal.

Figure 18:
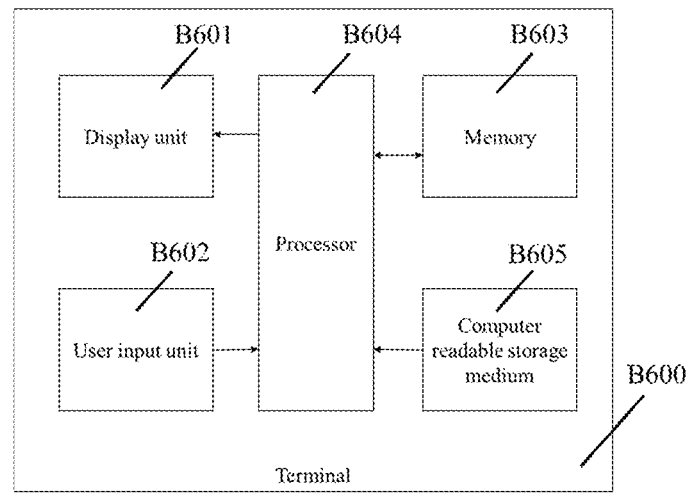
FIG. 18 is a structural schematic diagram of partial hardware of an embodiment of a computer terminal in Invention B.

FIG. 18 is a schematic diagram of a hardware structure of a computer terminal of Invention B. The computer terminal B600 may include: a display unit B601, a user input unit B602, a memory B603, a processor B604 and a computer readable storage medium B605. Those skilled in the art can understand that the structure of the computer terminal shown in FIG. 18 does not limit the computer terminal. The computer terminal may include more or fewer components than those shown in the figure, or combine certain components or different component arrangement.

Various components of the computer terminal B700 will be described below in detail with reference to FIG. 14 and FIG. 15:

The display unit B701 is used for displaying the information input by the user or information provided to the user. The display unit B701 may include a display panel which may be configured in the form of a liquid crystal display (LCD), an organic light-emitting diode (OLED), and the like.

The user input unit B702 can be used for receiving inputted digital or character information, and generating key signal inputs related to user setting and functional control of an electronic device. Specifically, the user input unit B702 may include a keyboard, a mouse and other input devices, such as a touch control panel. The user input unit B702 can also include other input devices, such as one or more of functional keys (such as volume control keys and switch keys), trackballs and operating rods, which are not specifically limited herein.

Further, if the touch control panel is used as the input unit, the touch control panel can cover the display panel. After the touch control panel detects touch operation on or near the touch control panel, the touch operation is sent to the processor B704 to determine the type of a touch event. Then, the processor B704 provides corresponding visual output on the display panel B701 according to the type of the touch event. Although the touch control panel and the display panel B701 are used as two independent components to achieve the input and output functions of the mobile computer terminal B700 in FIG. 19, in some embodiments, the touch control panel and the display panel B701 can be integrated to achieve the input and output functions of the desktop computer, which is not specifically limited herein.

The memory B703 is used to store software programs and various data. The memory B703 may mainly include a program storage region and a data storage region, wherein the program storage region can store the operating system, application programs (such as CAD application programs) required by at least one function, and the like; and the data storage region can store data (such as audio data, drawing data and referencing rule files) created according to the use of the computer device. In addition, the memory B703 may include a high-speed random-access memory, and may also include a non-volatile memory, such as at least one disk storage device, flash memory device or other volatile solid-state storage devices.

Figure 19:
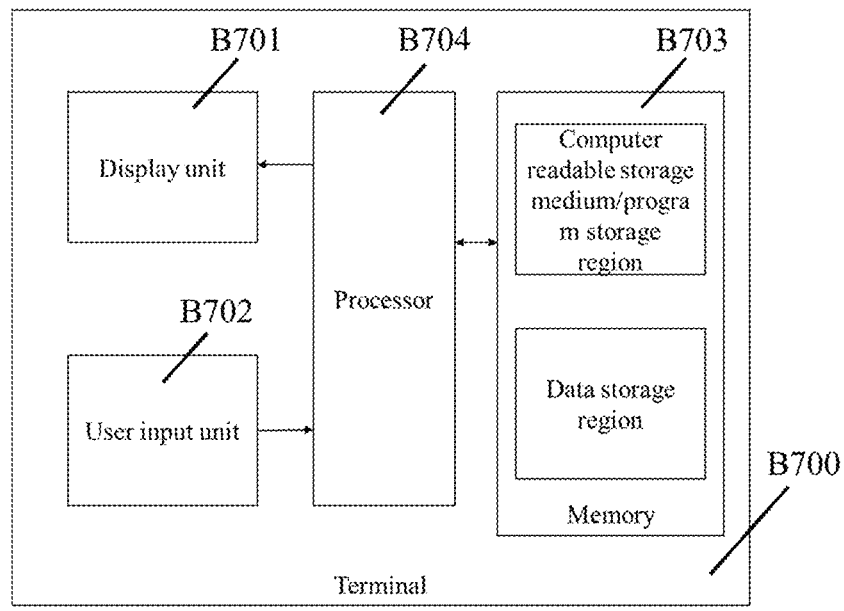
FIG. 19 is a structural schematic diagram of partial hardware of another embodiment of a computer terminal in Invention B.

By referring to FIG. 18 and FIG. 19, in a specific embodiment, the computer readable storage medium is a part of the memory, such as a program storage region, and of course can also be individually used as a storage unit. The computer readable storage medium comprises a group of instructions, and when at least one processor executes the group of instructions, at least one processor executes the following operation: generating at least one referencing rule file independent of the referenced file according to at least one referencing condition added by the referenced file, and storing the referencing rule file independently of the referenced file in an extensible format; referencing the referenced file according to the selected at least one referencing rule file.

The processor B704 is a control center of the electronic device, uses various interfaces and circuits to connect various parts of the entire electronic device, and performs various functions and processing data of the computer by operating or executing the software programs and/or modules stored in the memory B704 and calling the data stored in the memory B703, so as to monitor the computer as a whole. The processor B704 may include one or more processing units. Preferably, the processor B704 may be integrated with an application processor which mainly processes the operating system, the user interface, and the application programs.

The computer terminal B700 can also include a communication module and the like, not shown in FIG. 18 and FIG. 19, which will not be described herein.

It should be noted that terms of "comprise", "include" or any other variant herein are intended to cover non-exclusive inclusion, so that a process, a method, an article or a device which includes a series of elements not only includes such elements, but also includes other elements not listed clearly or also includes inherent elements in the process, the method, the article or the device. Under the condition of no more limitation, the elements defined by a sentence "include one . . . " do not exclude additional identical elements in the process, the method, the article or the device which includes the elements.

Through the description of the above embodiments, those skilled in the art can clearly understand that the above embodiment methods can be achieved in the manner of using software and a necessary common hardware platform and certainly can also be achieved using hardware. However, in many cases, the former is a better implementation. Based on such understanding, the technical solution of Invention B can be reflected in a form of a software product in essence or in a part of making a contribution to the prior art. The computer software product is stored in a storage medium (such as an ROM/RAM, a disc and a CD), including several instructions to enable one computer terminal (which may be a mobile phone, a computer, a server or a network device) to execute the methods of various embodiments of Invention B. The embodiments of Invention B are described above with reference to the drawings, but Invention B is not limited to the above specific embodiments. The above specific embodiments are only illustrative, not restrictive. Under the enlightenment of Invention B, those ordinary skilled in the art can make many forms without departing from the objective of Invention B and the protection scope of the claims, and these forms are protected by Invention B.

Invention C: A Hierarchical Operating System and Method Referenced by a CAD System, a Computer Readable Storage Medium and a Computer Terminal Invention C relates to a hierarchical operating method and system referenced by a (Computer Aided Design) CAD system, a computer readable storage medium and a terminal.

External reference (abbreviated as XREF) means that in the CAD environment, the user uses the external reference method to see any other drawing in the current own drawing file. For example, when designer A draws drawing a, designer A introduces drawing b drawn by another designer (or other formats, such as external files of pdf or pictures) into drawing a as the base drawing for reference in the external reference mode, wherein drawing b is the external file referenced by drawing a, also known as external reference.

Collaborative design divides the files in the design process into several module files according to the design requirements of different professions and then assembles the files through the external reference function of the CAD system by means of a shared platform of the server, i.e., a way of design work on a project collaboratively by multiple people in multiple places. In the process of collaborative design, designers of different professions reference the CAD drawings drawn by other designers, generating various reference relationships. For example, when designer A draws a, the drawing b drawn by designer B is used as the base drawing for reference. Drawing b of designer B also references drawing c drawn by designer C, which forms a nesting reference relationship.

However, the designers in different professions often focus on different directions. Therefore, when a complex reference relationship exists, a designated reference mode can be "overlay reference" or "attach reference".

If the user selects "overlay reference", then other external references nested and referenced in the external references referenced in the current drawing may not be displayed in the current drawing. For example, when designer A draws drawing a, designer A references drawing b and selects "overlay reference". Then, the external reference c nested and referenced in drawing b may not be displayed in the current drawing a.

If the user selects "attach reference", then other external references nested and referenced in the external references referenced in the current drawing are also displayed in the current drawing. For example, when designer A draws drawing a, designer A references drawing b and selects "attach reference". Then, the drawing a displays drawing b and also displays the external reference drawing c nested and referenced in drawing b.

In actual project application, once the type of external reference is designated, it will be difficult to change the reference relationship between the external reference and other nested and referenced external references. For example, drawing b adopts "overlay reference" mode to reference the drawing c, and adopts "attach reference" mode to reference the drawing d. The drawing a designates the type of referencing the drawing b as "attach reference". At this moment, drawing b and drawing d are simultaneously displayed in drawing a, and drawing c is not displayed. If the designer wants to display drawing c later, the designer can only start from the beginning, that is, firstly changing the reference mode of drawing b to drawing c (that is, changed to "attach reference"), and then re-introducing the external reference b into drawing a.

Similarly, if the designer does not want to display drawing d later, the designer can only start from the beginning, that is, firstly changing the reference mode of drawing b to drawing d (that is, changed to "overlay reference"), and then re-introducing the external reference b into drawing a. Therefore, in the traditional CAD system, the operation of changing the reference mode is very tedious and not flexible. In addition, the user of the current drawing may not have the necessary authority to change the reference mode of the drawing selected for reference to other drawings—for example, when the HVAC engineer references the water supply and drainage drawing, the HVAC engineer may not have the authority to change the reference mode of the water supply and drainage drawing to the construction drawing (at this moment, the authority belongs to the water supply and drainage engineer).

On the other hand, for a reference relationship with multiple levels of nesting and referencing, one file generally repeatedly references an external reference. In drawing a, two external reference drawings b are repeatedly referenced, and drawing b references drawing c. Once the drawing b is detached or unloaded, the two drawings b repeatedly referenced in drawing a and the drawing c in the drawing b will disappear, that is, each external reference cannot be independently operated, and the flexibility is poor, which is not convenient for the user to operate, reducing the working efficiency.

The objective of Invention C is to provide a novel referencing mode for the CAD system to overcome or alleviate the above shortcomings of the external reference mode in the existing CAD system to a certain extent.

To achieve the above objective, Invention C discloses a hierarchical operating system referenced by a CAD system, comprising: a first file comprising at least one first element; a second file comprising at least one second element; the at least one first element is copied and superimposed to the second file; the at least one first element is associated with a first control point; and independent operations for the at least one first element can be achieved through the first control point.

Further, the at least one second element is associated with a second control point; and independent operations for the at least one second element can be achieved through the second control point.

Further, the at least one first element and the at least one second element are copied and superimposed to a third file.

Further, the first control point is configured as a sub-control point of the second control point; and simultaneous operations for (i) the at least one second element and (ii) the at least one first element associated with the first control point can be achieved through the second control point.

Further, the at least one first element and the at least one second element are copied and superimposed to a third file.

Further, the hierarchical operating system also comprises a fourth file comprising at least one fourth element; the at least one fourth element is copied and superimposed to the second file; the at least one fourth element is associated with a fourth control point; and independent operations for the at least one fourth element can be achieved through the fourth control point.

Further, the first file and the fourth file are the same CAD drawing.

Further, the at least one first element is also directly associated with the second control point; and simultaneous operations for the at least one first element and the at least one second element can be achieved through the second control point. Further, the operation is display, hiding, binding, unbinding, reloading or unloading. Further, the at least one first element and the at least one second element is an entity, object, block and/or group on a CAD drawing.

To overcome and alleviate the shortcomings of the external reference mode in the existing CAD system, Invention C also discloses a hierarchical operating method referenced by a CAD system, comprising the following steps: acquiring at least one first element from a first file; creating the first control point which is associated with the at least one first element; copying and superimposing the at least one first element into a second file; and independently operating the at least one first element through the first control point.

Further, the hierarchical operating method also comprises the following steps: acquiring at least one second element from the second file; creating a second control point which is associated with the at least one second element; copying and superimposing the at least one first element and the at least one second element into a third file; and independently operating the at least one second element through the second control point.

Further, the hierarchical operating method also comprises the following steps: configuring the first control point as a sub-control point of the second control point; and simultaneously operating (i) the at least one second element and (ii) the at least one first element associated with the first control point through the second control point.

Further, the hierarchical operating method also comprises the following steps: acquiring at least one fourth element from a fourth file; creating a fourth control point which is associated with the at least one fourth element; copying and superimposing the at least one fourth element into the second file; and independently operating the at least one fourth element through the fourth control point.

Further, the first file and the fourth file are the same CAD drawing. Further, the hierarchical operating method also comprises the following steps: directly associating the at least one first element with the second control point; and simultaneously operating the at least one first element and the at least one second element through the second control point. Further, the operation is display, hiding, binding, unbinding, reloading or unloading. Further, the at least one first element is an entity, object, block and/or group on a CAD drawing.

To overcome and alleviate the shortcomings of the external reference mode in the existing CAD system, Invention C also discloses a hierarchical operating system referenced by a CAD system, comprising: a file storage module for storing a first file and a second file; an element acquisition module for acquiring at least one first element from the first file; a control point creation module for creating the first control point which is associated with the at least one first element; a copying and superimposing module for copying and superimposing the at least one first element into the second file; and a control point operation module for independently operating the at least one first element associated with the first control point.

Further, the element acquisition module acquires at least one second element from the second file; the control point creation module creates a second control point which is associated with the at least one second element; the copying and superimposing module copies and superimposes the at least one first element and the at least one second element into a third file; and the third file is stored in the file storage module; the control point operation module independently operates the at least one second element associated with the second control point.

Further, Invention C also comprises: a control point level construction module for configuring the first control point as a sub-control point of the second control point; the control point operation module achieves the simultaneous operation of (i) the at least one second element and (ii) the at least one first element associated with the first control point by operating the second control point.

Further, the element acquisition module acquires at least one fourth element from a fourth file; the fourth file is stored in the file storage module; the control point creation module creates a fourth control point which is associated with the at least one fourth element; the copying and superimposing module copies and superimposes the at least one fourth element into the second file; and the control point operation module independently operates the at least one fourth element by operating the fourth control point.

Further, the first file and the fourth file are the same CAD drawing. Further, Invention C also comprises: the control point creation module directly associates the at least one first element with the second control point; and the control point operation module simultaneously operates the at least one first element and the at least one second element by operating the second control point. Further, the control point operation module can realize display, hiding, binding, unbinding, reloading and/or unloading. Further, the at least one first element is an entity, object, block and/or group on a CAD drawing.

To overcome and alleviate the shortcomings of the external reference mode in the existing CAD system, Invention C also discloses a computer readable storage medium, comprising a group of instructions, wherein when the instructions are being executed, at least one processor performs the following operations: acquiring at least one first element from a first file; creating a first control point which is associated with the at least one first element; copying and superimposing the at least one first element into a second file; and independently operating the at least one first element through the first control point.

To overcome and alleviate the shortcomings of the external reference mode in the existing CAD system, Invention C also discloses a computer terminal, comprising at least one processor, and a computer readable storage medium coupled to the processor, wherein the computer readable storage medium comprises a group of instructions; when the instructions are executed by at least one processor, at least one processor performs the following operations: acquiring at least one first element from the first file; creating a first control point which is associated with the at least one first element; copying and superimposing the at least one first element into a second file; and independently operating the at least one first element through the first control point.

To make the objective, the technical solution and advantages of the embodiments of Invention C clearer, the technical solution in the embodiments of Invention C will be clearly and fully described below in combination with the drawings in the embodiments of Invention C. Apparently, the described embodiments are part of the embodiments of Invention C, not all of the embodiments. Based on the embodiments in Invention C, all other embodiments obtained by those ordinary skilled in the art without contributing creative labor will belong to the protection scope of Invention C.

Embodiment 1 of Invention C

The steps of Invention C are described with examples. Three persons A, B and C work together to draw their respective drawing contents. When drawing, A needs to reference the content of B, and B needs to reference the content of C, and A may not need to see the content of C. The steps are as follows:

C draws graph (C106) and submits the graph to the server.

B downloads the drawing (C106) of C, and references C when drawing B's own drawing (C104). The content of C (C106) is copied and superimposed onto B (C104).

A downloads drawing (C104) of B, and references B (C104) when drawing A's own drawing (C102). The content of B (C104) is copied and superimposed onto A (C102).

Figure 21A:
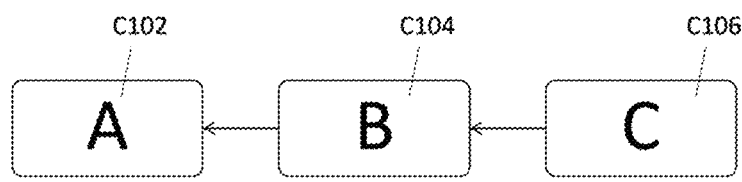
FIG. 21 is a flow chart of a method of a hierarchical display embodiment referenced by a CAD graphical system in Invention C.

At this moment, a nesting relationship from A to B to C exists (FIG. 21(a)).

If A needs to seethe content of C (C106), A can choose to expand the sublevel reference of B. Invention C will copy and superimpose the content of C (C106) onto A(C102), so that A(C102) can see the contents of B(C104) and C(C106) simultaneously.

If A does not need to see C (C106), A chooses to close the sublevel reference of B. Invention C will delete the copied content of C, so that A only sees the content of B (C104).

Figure 21B:
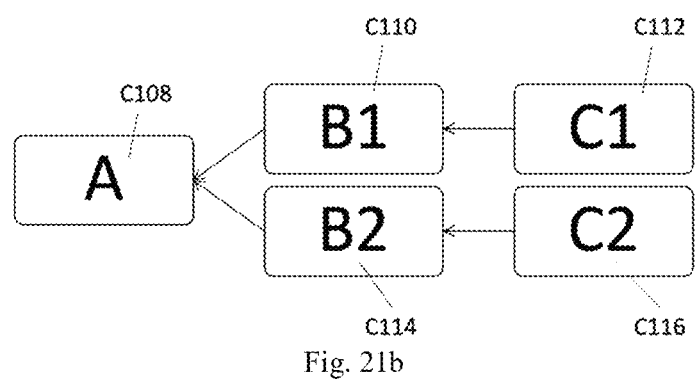
Figure 22:
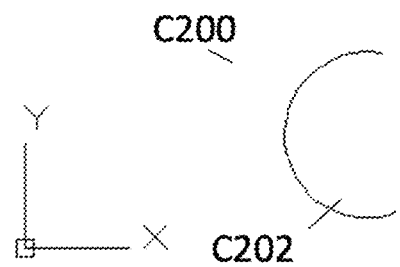
FIG. 22 is a schematic diagram of a physical graph in drawing c of an embodiment of Invention C.

A (C108) can reference multiple Bs (FIG. 21 (b)), set as B1 (C110) and B2(C114), close the sublevel C1 (C112) of B1(C110) or close B1(C110) without affecting the content display of B2 (C114) and/or the sublevel C2 (C116), thereby achieving a flexible display effect of multiple referenced contents without mutual interference.

Embodiment 2 of Invention C

Figure 23:
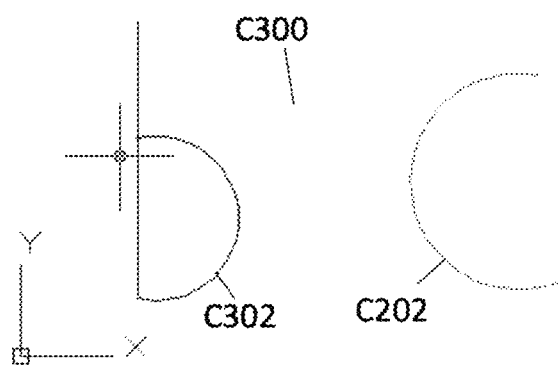
FIG. 23 is a schematic diagram of a physical graph in drawing b of an embodiment of Invention C.
Figure 24:
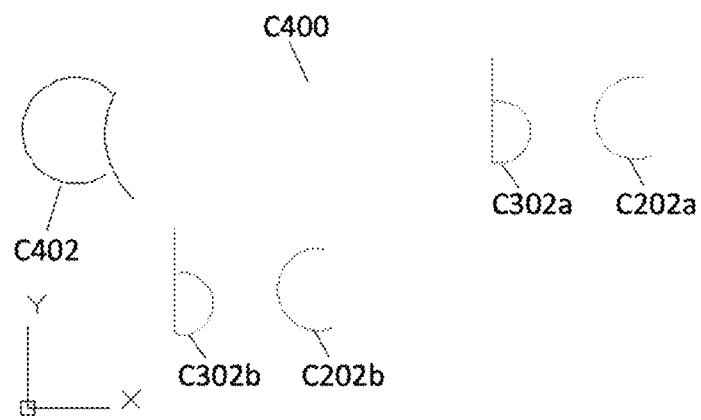
FIG. 24 is a schematic diagram of a physical graph in drawing a of an embodiment of Invention C.
Figure 25:
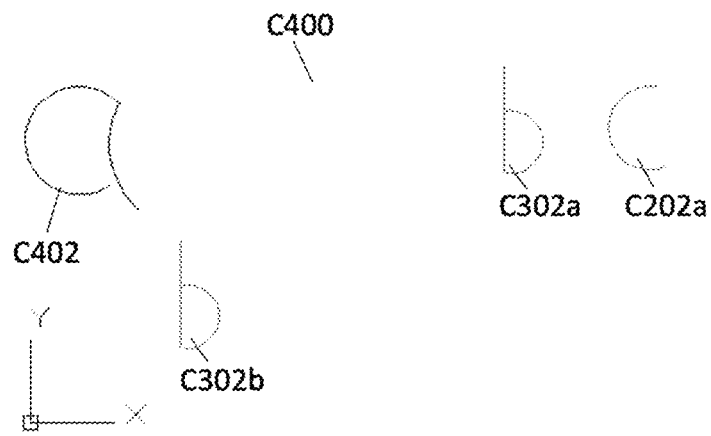
FIG. 25 is a hierarchical tree relationship diagram referenced in an embodiment of Invention C.
Figure 26:
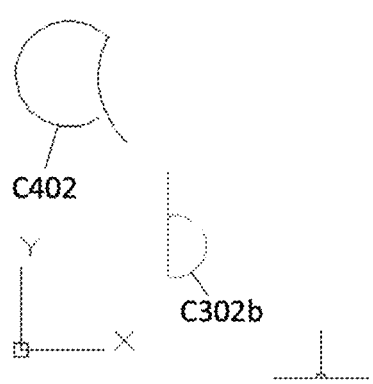
Figure 27:
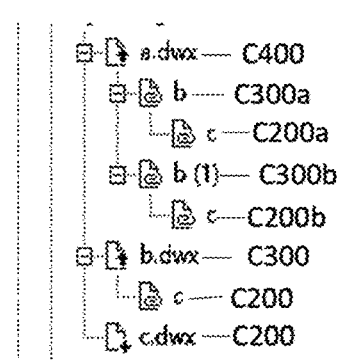

To simulate an application scenario. The current working drawing is a.dwx (C400). Two copies of b.dwx (C300a and C300b) are referenced in different positions, and b.dwx file also references c.dwx (C200). The content of c, as shown in FIG. 2, is a graph c (C202). The content of b, as shown in FIG. 23, is the content of c plus graph b (C302). The content of a, as shown in FIG. 24, is the content of two b plus a graph a (C402) to form a tree relationship C500 as shown in FIG. 25. When the CAD user does not want to see the content of one of c (C202b) temporarily, the CAD user can issue a command of closing the reference to the collaborative system. Then, the designated c (C202b) will disappear, and the content of a will become as shown in FIG. 26. The content of b can also be closed. Each level can be controlled, and each reference can be controlled independently. The effect of closing one b (C300a) on the basis of closing one c (C202b) is shown in FIG. 27.

In some embodiments, independent control is achieved through control points. For example, c (C202b) is associated with a control point, and the control point can add a unique tag to the element in c.dwx (C200) to achieve independent control of the element set, and can also extract the common attributes of the elements in c.dwx (C200) (for example, the common attribute is that the elements are all from the drawing c.dwx (C200)) to achieve independent control of the element set. Besides the above two modes, other common control modes in the CAD system can also be applied to the Invention C, which belongs to the scope of the Invention C.

Embodiment 3 of Invention C

In some embodiments, Invention C discloses a hierarchical display system referenced by a CAD graphical system, comprising: the first CAD drawing (for example, a HVAC drawing); the second CAD drawing (for example, an electrical drawing), wherein the second CAD drawing is referenced by the first CAD drawing, and the content of the second CAD drawing is copied and superimposed into the first CAD drawing, and can be displayed or hidden; the third CAD drawing (for example, a construction drawing), wherein the third CAD drawing is referenced by the second CAD drawing, and the content of the third CAD drawing is copied and superimposed into the second CAD drawing, and can be displayed or hidden. When the first CAD drawing references the second CAD drawing, the third CAD drawing is indirectly referenced (which forms the so-called nesting relationship). The content of the third CAD drawing is also copied and superimposed into the first CAD drawing, and can be displayed or hidden. In the embodiments, Invention C does not need to re-insert the reference. A simple clicking on the operation interface directly is able to display and close the reference. There is no limitation as to the operation of the top-level reference. The operation of each reference is independent. The references to the same source reference can be controlled separately.

Embodiment 4 of Invention C

In some embodiments, Invention C discloses a hierarchical operating system referenced by a CAD system, comprising: a first file comprising at least one first element; a second file comprising at least one second element; the at least one first element is copied and superimposed to the second file; the at least one first element is associated with a first control point; and independent operations for the at least one first element can be achieved through the first control point.

The difference between Invention C and the existing CAD drawing platform is that the contents (i.e., various CAD elements, such as entities, objects, blocks and groups) of the referenced CAD drawing (the "first file") are copied and superimposed into the current CAD drawing (the "second file"), and the copied and superimposed contents have been associated with the first control point and thus can be directly controlled by the user editing the current CAD drawing. For example, one or more first elements (for example, the drawing drawn by the construction engineer is the first file, and the drawing includes building walls) extracted from the first file can be displayed on the drawing (second file) drawn by the water supply and drainage engineer through the first control point, and all the building walls can also be hidden.

Further, in some embodiments, one or more second elements (such as pipelines and sinks) on the second file (such as the water supply and drainage drawings) are associated with the second control point, and the water supply and drainage engineer can also control one or more second elements through the second control point (display or hide water supply and drainage entities such as pipelines and sinks). In the present embodiment, because the first element (such as the construction entity) and the second element (such as the water supply and drainage entity) on the second file are controlled by different control points, when the water supply and drainage engineer controls the display or hiding of the first element through the first control point, the second element on the second file is not affected. Similarly, when the water supply and drainage engineer controls the display or hiding of the second element through the second control point, the first element copied and superimposed onto the second file is also not affected. In other words, through the control points, the water supply and drainage engineer who draws the current CAD drawing can independently control and operate the water supply and drainage entities and/or objects drawn by the engineer, and can also independently control and operate the construction entities and/or objects copied and superimposed from the construction CAD drawings.

Further, in some embodiments, the first element (such as construction entities and/or objects) and the second element (such as water supply and drainage entities and/or objects) are copied and superimposed into the third file (such as electrical CAD drawing).

As mentioned above, in the prior art, after the CAD drawings are superimposed to form a nesting relationship, it is very troublesome for conversion between the display of the first element (that is, the attach reference is selected between the first file and the second file) and the hiding of the first element (that is, the overlay reference is selected between the first file and the second file), which requires to reset the reference mode between the first file and the second file. Downstream engineers (such as electrical engineers in the present embodiment) often have no authority to modify the reference mode set by the water supply and drainage engineer. Such a problem is particularly tricky in collaborative drawing projects because the CAD drawings may have many superimposing levels which are more than the three-level superimposition described in the present embodiment.

However, in the embodiment of Invention C, because the first element is associated with the first control point, displaying or hiding can be independently achieved by operating the first control point. Then, when the electrical engineer wants to see the building wall, the first element can be displayed through the first control point, and when the electrical engineer only wants to see the water supply and drainage elements such as pipelines and sinks, the first element can be completely hidden through the second control point. This avoids the trouble of resetting the reference relationship between the construction drawing and the water supply and drainage drawing in the prior art, and improves the working efficiency during collaborative work.

In some embodiments, the first control point is configured as a sub-control point of the second control point; and simultaneous operations for (i) the at least one second element and (ii) the at least one first element associated with the first control point can be achieved through the second control point. In the embodiments, when the downstream electrical engineer copies and superimposes the second element in the second file into the third file through the second control point, the first element is simultaneously copied and superimposed into the third file. The downstream electrical engineer can simultaneously operate the first element (such as a construction entity) and the second element (such as a water supply and drainage entity) through the second control point to simultaneously display or hide the first element and the second element. Of course, if the downstream electrical engineer only wants to hide the construction entity, the first control point can be operated individually without any influence on the display of the water supply and drainage entity.

In some embodiments, the hierarchical operating system referenced by the CAD system of Invention C also comprises a fourth file (such as an HVAC CAD drawing) comprising at least one fourth element (such as an HVAC entity and object). The at least one fourth element is copied and superimposed to the second file; the at least one fourth element is associated with the fourth control point; and independent operations for the at least one fourth element can be achieved through the fourth control point. In the embodiments, the water supply and drainage engineer can respectively control and operate the construction elements and HVAC elements through the first control point and the fourth control point. In other embodiments, the fourth file and the first file are the same CAD drawing file, and the water supply and drainage engineer can also display or hide the construction elements in different positions through the first control point and the fourth control point. In other words, the same CAD drawing can be repeatedly copied and superimposed into the higher-level CAD drawing, and can also be operated and controlled individually.

In some embodiments, unlike configuring the first control point as the sub-control point of the second control point, the first element in the first file can be directly associated with the second control point, which can also achieve simultaneous operations of the first element and the second element. In other words, in the embodiments, the second control point is simultaneously associated with the first element and the second element. When the downstream electrical engineer needs to simultaneously display or hide the construction element and the water supply and drainage element, only the second control point needs to be operated. Of course, if the downstream electrical engineer only needs to hide the construction element, the first control point can be operated individually. At this moment, only the construction element is hidden, and the water supply and drainage element is not affected.

In some embodiments, besides display and hiding, the operation can also be binding, unbinding, reloading or unloading.

In some embodiments, the at least one first element and the at least one second element is an entity, object, block and/or group on a CAD drawing.

Embodiment 5 of Invention C

Figure 28:
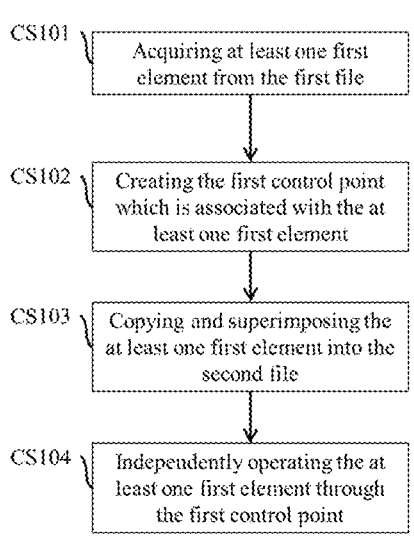
FIG. 28 is a flow chart of an embodiment of a hierarchical operating method referenced by a CAD system in Invention C.

In some embodiments, Invention C discloses a hierarchical operating method referenced by a CAD system, comprising the following steps (FIG. 28):

CS101 acquiring at least one first element from the first file;

CS102 creating the first control point which is associated with the at least one first element;

CS103 copying and superimposing the at least one first element into the second file;

CS104 independently operating the at least one first element through the first control point.

The difference between Invention C and the existing external reference method of the CAD drawing is that the contents (i.e., various CAD elements, such as entities, objects, blocks and group) of the referenced CAD drawing (the "first file", such as a construction CAD drawing) are copied and superimposed into the current CAD drawing (the "second file", such as a water supply and drainage CAD drawing). Moreover, the copied and superimposed contents have been associated with the first control point and thus can be directly controlled by the user editing the current CAD drawing. Namely, one or more first elements (for example, the drawing drawn by the construction engineer is the first file, and the drawing includes building walls) extracted from the first file can be displayed on the drawing (second file) drawn by the water supply and drainage engineer through the first control point, and all the building walls can also be hidden.

Figure 29:
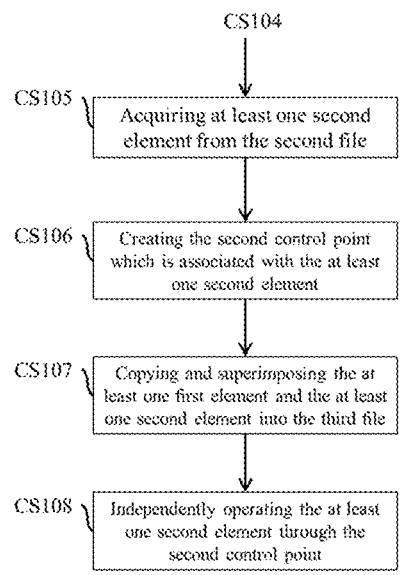
FIG. 29 is a flow chart of an embodiment of a hierarchical operating method referenced by a CAD system in Invention C.
Figure 30:
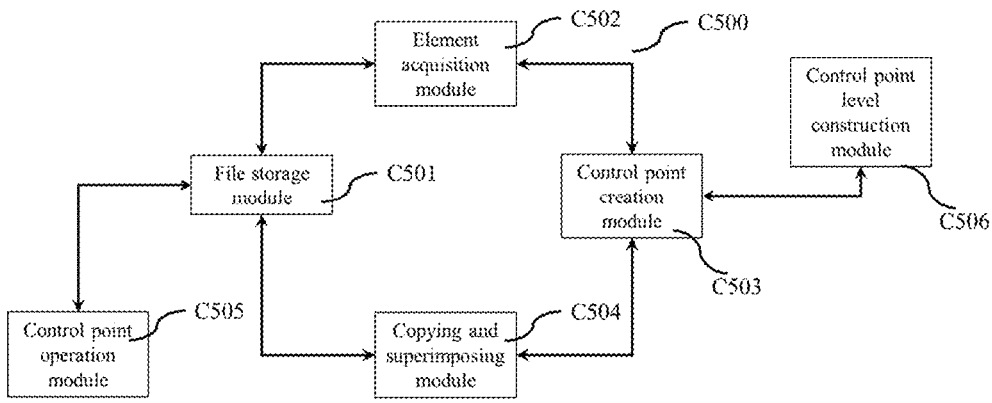
FIG. 30 is a schematic diagram of an embodiment of a hierarchical operating system referenced by a CAD system in Invention C.

In some embodiments, the operating method of Invention C also comprises the following steps (FIG. 29): CS105 acquiring at least one second element from the second file; CS106 creating the second control point which is associated with the at least one second element; CS107 copying and superimposing the at least one first element and the at least one second element into the third file; and CS108 independently operating the at least one second element through the second control point.

In some embodiments, the operating method of Invention C also comprises the following steps: configuring the first control point as a sub-control point of the second control point; and simultaneously operating (i) the at least one second element and (ii) the at least one first element associated with the first control point through the second control point.

In some embodiments, the operating method of Invention C also comprises the following steps: acquiring at least one fourth element from a fourth file; creating a fourth control point which is associated with the at least one fourth element; copying and superimposing the at least one fourth element into the second file; and independently operating the at least one fourth element through the fourth control point.

In some embodiments, the first file and the fourth file are the same CAD drawing. The embodiments actually reflect that one CAD file can be repeatedly referenced by another CAD file, but the CAD user still can independently control the repeated references by setting different control points.

In some embodiments, the operating method of Invention C also comprises the following steps: directly associating the at least one first element with the second control point; and simultaneously operating the at least one first element and the at least one second element through the second control point. One applicable scenario of the embodiments is: the downstream HVAC engineer needs to simultaneously reference the construction condition and electrical condition when drawing, and does not need to individually see the construction or electrical layout. Therefore, the elements of construction drawings and electrical drawings are associated with the same control point. Namely, multi-level elements can be opened and closed simultaneously through a single control, which can improve the drawing efficiency of the CAD user in this scenario.

In some embodiments, the operation is display, hiding, binding, unbinding, reloading or unloading. In some embodiments, the at least one first element is an entity, object, block and/or group on a CAD drawing.

Embodiment 6 of Invention C

In some embodiments, Invention C discloses a hierarchical operating system C500 referenced by a CAD system, comprising: a file storage module C501 for storing the first file and the second file; an element acquisition module C502 for acquiring at least one first element from the first file; a control point creation module C503 for creating the first control point which is associated with the at least one first element; a copying and superimposing module C504 for copying and superimposing the at least one first element into the second file; and a control point operation module C505 for independently operating the at least one first element associated with the first control point. In some embodiments, the modules can be independently placed, or integrated together.

In some embodiments, the element acquisition module C502 acquires at least one second element from the second file; the control point creation module C503 creates the second control point which is associated with the at least one second element; the copying and superimposing module C504 copies and superimposes the at least one first element and the at least one second element into the third file; and the third file is stored in the file storage module C501; the control point operation module C505 independently operates the at least one second element associated with the second control point.

In some embodiments, the operating system of Invention C also comprises: a control point level construction module C506 for configuring the first control point as a sub-control point of the second control point; the control point operation module C505 achieves the simultaneous operation of (i) the at least one second element and (ii) the at least one first element associated with the first control point by operating the second control point.

In some embodiments, the element acquisition module C502 acquires at least one fourth element from the fourth file; the fourth file is stored in the file storage module C501; the control point creation module C503 creates the fourth control point which is associated with the at least one fourth element; the copying and superimposing module C504 copies and superimposes the at least one fourth element into the second file; and the control point operation module C505 independently operates the at least one fourth element by operating the fourth control point.

In some embodiments, the first file and the fourth file are the same CAD drawing.

In some embodiments, the control point creation module C503 directly associates the at least one first element with the second control point; and the control point operation module C505 simultaneously operates the at least one first element and the at least one second element by operating the second control point.

In some embodiments, the control point operation module C505 can realize display, hiding, binding, unbinding, reloading and/or unloading. In some embodiments, the at least one first element is an entity, object, block and/or group on a CAD drawing.

Embodiment 6 of Invention C

In some embodiments, Invention C discloses a computer readable storage medium, comprising a group of instructions; when the instructions are being executed, at least one processor performs the following operations: acquiring at least one first element from a first file; creating a first control point which is associated with the at least one first element; copying and superimposing the at least one first element into a second file; and independently operating the at least one first element through the first control point.

Embodiment 7 of Invention C

In some embodiments, Invention C discloses a computer terminal, comprising at least one processor, and a computer readable storage medium coupled to the processor, wherein the computer readable storage medium comprises a group of instructions; when the instructions are executed by at least one processor, at least one processor performs the following operations: acquiring at least one first element from the first file; creating a first control point which is associated with the at least one first element; copying and superimposing the at least one first element into a second file; and independently operating the at least one first element through the first control point.

Through the above embodiments, it can be seen that Invention C has at least the following technical advantages:
1. Convenient and efficient: when the CAD elements of external reference need to be displayed or hidden due to actual needs, the engineer does not need to re-insert the reference (such as conversion between the overlay mode and the attach mode), and can simply click the corresponding control point directly on the operation interface of the CAD collaborative system to display and close the referenced contents.

The existing CAD drawing platform usually uses the external reference mode. Therefore, the nested reference mode (the overlay reference or the attach reference) cannot be easily modified after added. To hide the nested reference (that is, conversion from the attach reference to the overlay reference) or display the nested reference (that is, conversion from the overlay reference to the attach reference), the referenced drawing must be opened to adjust the reference mode of the nested reference.

The difference between Invention C and the existing CAD drawing platform is that the content of the referenced CAD drawing is copied and superimposed into the current CAD drawing, and the copying and superposition can be directly controlled by the user editing the current CAD drawing. Therefore, when the nesting relationship appears during the course of layer-by-layer superimposition of the CAD drawings, the user editing the current CAD drawing can control the display or hiding of the nested contents by deciding whether to perform the copying and superimposition operation among the CAD drawings.
2. Hierarchical operation: the nested reference of layers can still be operated arbitrarily. There is no limitation to the operation of the top-level reference, and there is no need to close the layers from the end node of the path (i.e., C2 in FIG. 25 (C200, C200*a* and C200*b*), also known as "leaf node").
3. The operation of each reference is independent, and the reference of the same source reference can be controlled separately, which alleviates the disadvantages of the existing external reference mode, in which "one open all open", "one close all close".
4. Invention C allows collaborative design to avoid the problem of circular references to a certain extent—graphs that contain nested references to the graphs are called circular references. For example, if graph A is attached to graph B, graph B is attached to graph C, and graph C is attached to graph A, then the reference sequence A>B>C>A is a circular reference. The external reference mode in the existing CAD system cannot well deal with the problem of circular reference—the "overlay" mode directly avoids the circulation situation (because C may not be displayed), and the "attach" mode may interrupt the circulation. In Invention C, because the drawings at each level are independently controlled, for example, the A referenced by C can be closed independently, no problem may be generated even if C circularly references A. For example, when the HVAC drawing references the water supply and drainage drawing, and the water supply and drainage drawing references the construction drawing, if the construction drawing circularly references the HVAC drawing, only a sub-control point for controlling the HVAC drawing needs to be set under the control points of the construction drawing. Therefore, Invention C can accommodate the relationship of the circular references.

The embodiments of Invention C are described above with reference to the drawings, but Invention C is not limited to the above specific embodiments. The above specific embodiments are only illustrative, not restrictive. Under the enlightenment of Invention C, those ordinary skilled in the art can make many forms without departing from the objective of Invention C and the protection scope of the claims, and these forms are protected by Invention C.

Invention D: A Method and System for Viewing Reference Change of a CAD Drawing in an Editable Environment, a Computer Readable Storage Medium and a Computer Terminal Invention D relates to a method and system for viewing reference change of a CAD drawing in an editable environment, a computer readable storage medium and a computer terminal.

When multiple people work collaboratively to complete one project, people are not completely independent of each other and have a reference relationship. People conduct one's own work on the basis of the work results of others, and also provide references for the work of others. Moreover, a meaningful design result is not completed at one go, but will be gradually improved after many modifications. The above situation will lead to an important step in the collaborative work, which is to update the modifications of the referenced CAD drawings of others (i.e., referenced files or cited files) to synchronize the latest results and ensure that the subsequent design work does not deviate. However, after the update, the user often finds that many contents have been changed. If the work content of the user is affected, the user needs to accurately locate the corresponding modification, and modify one's own work to adapt to the current state, which will take a lot of efforts and time.

Although the current traditional CAD drawing platform has a drawing comparison tool, the user needs to store the new and old versions of the CAD drawings, uses the comparison tool to load the two versions of the files, and then display the differences between the two versions of the CAD drawings in a drawing area. The drawing comparison tool has the following technical problems. In the process of collaborative drawing on the existing CAD drawing platform, the reference to the CAD drawings of others often uses the external reference (abbreviated as XREF) mode. For example, A references B, and B is modified and stored as a new version B'; and after A updates and references B, the content of the latest version of B, i.e., B', is directly seen; and the old version B is not displayed. Therefore, if A wants to see the modifications generated from B to B', A can only manually store an old version of the B file for comparison when A is prompted with update. The comparison process is to use the comparison tool to compare the old version B and the new version B' (for example, the "DWG comparison" tool provided in AUTOCAD), but the comparison process is performed outside the CAD drawings of A. For example, a new graph will be formed in AUTOCAD, which contains the comparison result, and the name of the comparison graph is a combination of the file names of comparison graphs, i.e., Compare_filename1 and filename2.dwg. Therefore, at this time, the contents of the CAD drawings of A cannot be seen. Even if A finds that the modification of B influences A's own design, A can only record the modification, and then opens A's own CAD drawings to make the corresponding modification.

In the traditional method of comparing the referenced files to view the modification of the referenced files, when the contents of the referenced file are updated, the modified and updated contents are difficult to be quickly found and located. Each version of the referenced file needs to be maintained. When the change of the external reference file is viewed, it is impossible to see the contents of one's current own CAD drawing, which is not conducive to the efficient development of collaborative work.

The objective of Invention D is to provide a novel mode for editing and viewing the change in the CAD system, so as to attempt to, to a certain extent, overcome or alleviate the technical problem in the existing CAD system wherein the changes cannot be simultaneously edited and viewed.

To achieve the above objective, Invention D discloses a method for viewing reference change of a CAD drawing in an editable environment, comprising the following steps: DS101 acquiring a first file and a second file; DS102 referencing the second file by the first file, and superimposing a first element on the second file into the first file; DS103 acquiring a third file; DS104 acquiring the first change element of the third file compared with the second file; and DS105 superimposing the first change element into the first file.

Further, on the first file, the first element superimposed is displayed in a first display mode; and displaying the first change element superimposed in a second display mode.

Further, on the first file, 1) the elements shared by the second file and the third file are displayed in a first mode; 2) the elements that only exist in the second file are displayed in a second mode; and 3) the elements that only exist in the third file are displayed in a third mode.

Further, Invention D further comprises: editing the first file and drawing a second element on the first file.

Further, Invention D also comprises: DS106 acquiring a fourth file; DS107 acquiring the second change element of the fourth file compared with the third file; and DS108 superimposing the second change element into the first file.

Further, on the first file, the second change element superimposed is displayed in a third display mode.

Further, the first change element comprises one or more of an added element, a deleted element and a modified element.

Further, the first change element is incremental data based on the third file compared with the second file.

Further, the second file and the third file are different versions of the same CAD drawing.

Further, the invention further comprises: storing the first file, the second file and the third file.

In order to overcome or alleviate the technical problem in the existing CAD system that the changes cannot be simultaneously edited and viewed, Invention D also discloses a system D500 for viewing reference change of a CAD drawing in an editable environment, comprising: a file acquisition module D501, an element acquisition module D502, a copying and superimposing module D504 and an updating and monitoring module D507; the file acquisition module D501 is configured to acquire a first file and a second file; the element acquisition module D502 is connected with the file acquisition module D501 and configured to acquire a first element on the second file; the copying and superimposing module D504 is connected with the element acquisition module D502 and configured to superimpose the first element into the first file; the updating and monitoring module D507 is connected with the file acquisition module D501 and configured to prompt the file acquisition module D501 to acquire a third file, compare the second file with the third file, and find a first change element; and the element acquisition module D501 is connected with the updating and monitoring module D507 and configured to acquire the first change element and superimpose the first change element into the first file through the copying and superimposing module D504.

Further, Invention D also comprises a display control module D508 operable for displaying the first element superimposed in the first display mode; and displaying the first change element superimposed in a second display mode.

Further, Invention D also comprises a display control module D508. The display control module is operable to be used for, on the first file, 1) displaying elements commonly shared by the second file and the third file in a first mode; 2) displaying elements that only exist in the second file in a second mode; and 3) displaying elements that only exist in the third file in a third mode.

Further, Invention D further comprises a file editing module D509 used for editing the first file and drawing a second element on the first file.

Further, the file acquisition module D501 is configured to acquire a fourth file; and the updating and monitoring module D507 is configured to compare the third file with the fourth file, find a second change element and superimpose the second change element into the first file through the copying and superimposing module D504.

Further, on the first file, the display control module D508 is used for displaying second change element superimposed in a third display mode.

Further, the first change element comprises one or more of an added element, a deleted element and a modified element.

Further, the first change element is incremental data based on the third file compared with the second file.

Further, the second file and the third file are different versions of the same CAD drawing.

Further, Invention D further comprises a file storing module configured to store the first file, the second file and the third file.

In order to overcome or alleviate the technical problem in the existing CAD system that the changes cannot be simultaneously edited and viewed, Invention D also discloses a computer readable storage medium for viewing reference change of a CAD drawing in an editable environment, wherein the computer readable storage medium comprises a group of instructions. When the instructions are being executed, at least one processor performs the following operations: DS101 acquiring a first file and a second file; DS102 referencing the second file by the first file, and superimposing a first element on the second file into the first file; DS103 acquiring a third file; DS104 acquiring a first change element of the third file compared with the second file; and DS105 superimposing the first change element into the first file.

In order to overcome or alleviate the technical problem in the existing CAD system that the changes cannot be simultaneously edited and viewed, Invention D also discloses a computer terminal for viewing reference change of a CAD drawing in an editable environment, comprising at least one processor, and a computer readable storage medium coupled to the processor, wherein the computer readable storage medium comprises a group of instructions; when the instructions are being executed by at least one processor, at least one processor performs the following operations: DS101 acquiring a first file and a second file; DS102 referencing the second file by the first file, and superimposing a first element on the second file into the first file; DS103 acquiring a third file; DS104 acquiring a first change element of the third file compared with the second file; and DS105 superimposing the first change element into the first file.

To make the objective, the technical solution and advantages of the embodiments of Invention D clearer, the technical solution in the embodiments of Invention D will be clearly and fully described below in combination with the drawings in the embodiments of Invention D. Apparently, the described embodiments are part of the embodiments of Invention D, not all of the embodiments. Based on the embodiments in Invention D, all other embodiments obtained by those ordinary skilled in the art without contributing creative labor will belong to the protection scope of Invention D.

Embodiment 1 of Invention D

Figure 31:
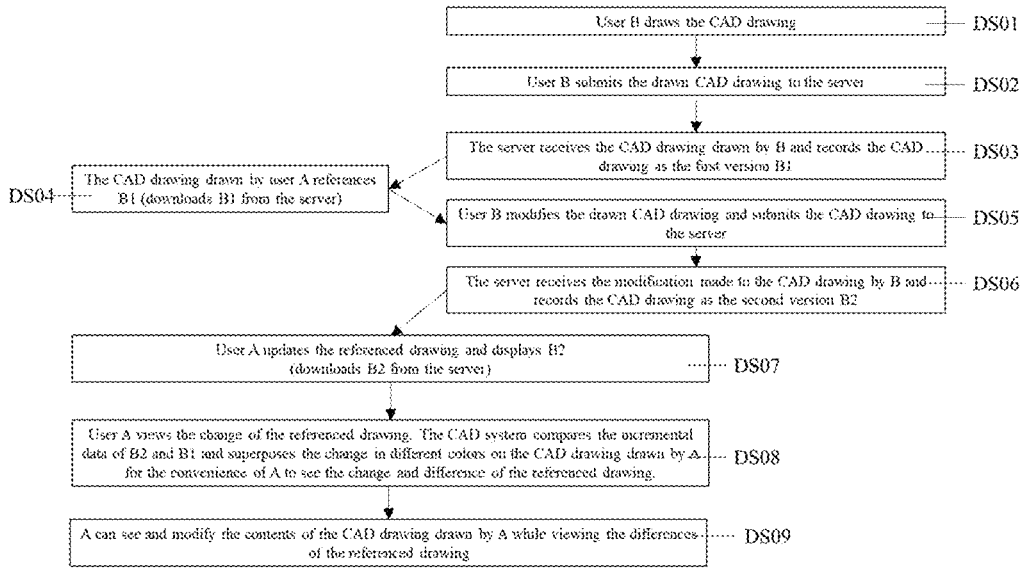
FIG. 31 is a flow chart of an embodiment of a method for viewing reference change of a CAD graph in an editable drawing environment in the present invention.

As shown in FIG. 31, a method for viewing reference change of a CAD drawing in an editable drawing environment comprises the following steps:

For the convenience of description, the current drawing person is set as A, and the referenced party is set as B.

B draws B's own drawing (DS01) and submits the drawing to the server (DS02); and the server records a version B1 (DS03).

A draws A's own drawing and references the work result of B. In the reference process, the contents of B are copied and superimposed onto the drawing of A. A can reference the contents of B when drawing A's own drawing (DS04).

B modifies B's own drawing and submits the drawing to the server again (DS05); and the server records the second version B2 (DS06).

A updates the referenced drawing. At this time, A sees the latest state of the drawing of B (DS07).

A views the change. The system compares the first version with the second version (i.e., B1 is compared with B2), and conducts analysis to obtain the incremental data of the two versions. These addition, deletion, and modification objects are superimposed in different colors into the drawing interface of the drawing of A (DS08). A can see and modify A's own contents while viewing the differences (DS09).

Embodiment 2 of Invention D

Figure 32:
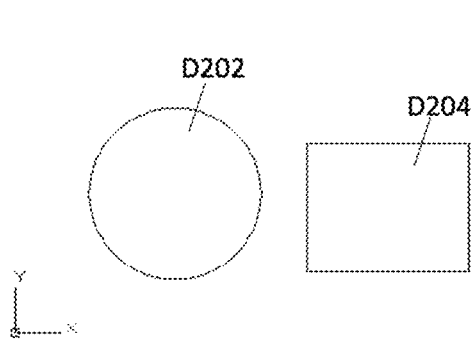
FIG. 32 is a schematic diagram of a CAD graph drawn by B in an embodiment of the present invention.
Figure 33:
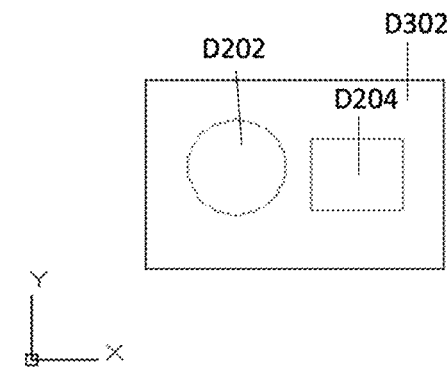
FIG. 33 is a schematic diagram of a CAD graph drawn by A with reference to B in an embodiment of the present invention.

To simulate an application scenario of Invention D, two CAD users A and B work collaboratively. A draws a file a.dwx, and B draws a file b.dwx. A references/cites the work result of B, and draws a frame to surround the contents of B as shown in FIG. 33. The current status of b.dwx is shown in FIG. 32. The circle D202 and the square wire frame D204 are the contents of b.dwx, and A draws an enclosing wire frame D302 around the contents. It should be noted that at this moment, A cannot modify the contents of the referenced b.dwx, that is, the circle D202 and the square wire frame D204 in frame D302 cannot be modified, and belong to the contents of the referenced file. For example, the downstream water supply and drainage engineers can only reference the construction CAD drawing drawn by the upstream construction engineers to draw their own water supply and drainage drawing, and usually have no authority to modify and adjust the drawing of the construction engineers.

Figure 34:
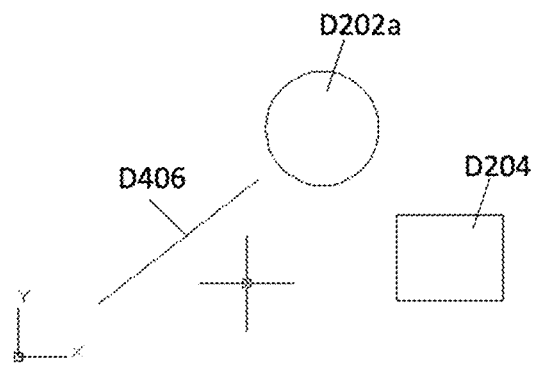
FIG. 34 is a schematic diagram of a CAD graph modified by B in an embodiment of the present invention.

At this time, B modifies the file b.dwx on B's own CAD operation terminal, draws a new line D406, and moves the position of the circle D202 (the circle in the new position is marked as D202a). Then, B submits the modification and stores the modification onto the server. At this moment, the file b.dwx is shown in FIG. 34. At this moment, A is prompted by the system for update (for example, A receives a prompt message on A's own CAD operation terminal). After the update, A wants to see the contents which have been modified in the update by B, as well as the influences on A's drawing. In the embodiments of Invention D, A does not need to find the previous version of b.dwx at this moment. When A uses a graphical interface to require viewing the change, the system compares the incremental data of the new and old versions, and then superimposes the added, deleted and modified contents in different colors (or other different forms, such as dotted lines or bold) into the current drawing area. A can continue to edit and modify the contents of the drawing while viewing the changes of b.dwx.

Figure 35:
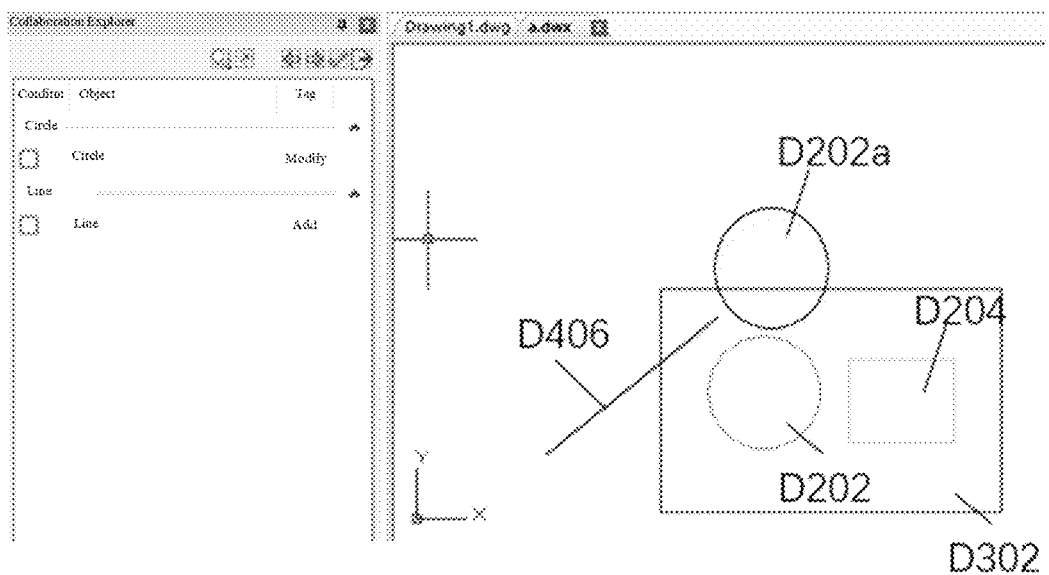
FIG. 35 is an interface diagram of viewing and editing a graph, which is modified by B, by A in an embodiment of the present invention.
Figure 36:
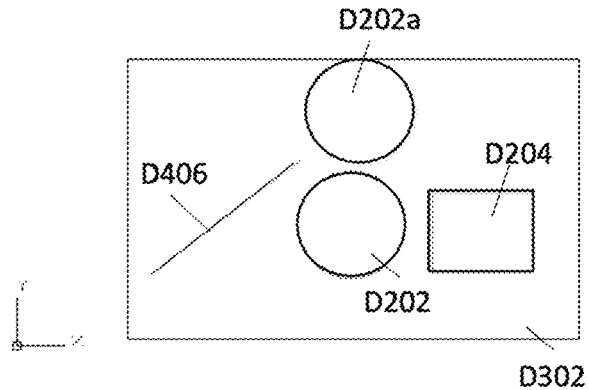
FIG. 36 is a schematic diagram of a graph drawn by A with reference to the modified CAD graph of B in an embodiment of the present invention.

The system displays the comparison as shown in FIG. 35. In the actual operating system, the added content (such as an added line D406) and the modified content (such as a moved circle D202a) can be marked in different colors. Meanwhile, a specific interface is used to provide a list of all modified contents (such as a list on the left); ad an item in the list can be clicked to accurately locate the position of the item in the graph, which is convenient for viewing when there are many changes. In the process of viewing the changes, the wire frame D302 drawn by A is displayed in its completeness on the CAD drawing currently being drawn by A, and can be directly modified. Therefore, the current drawing is in an editable environment and the changes of the referenced drawings of others can be viewed at the same time. In the simulation scenario, A enlarges the wire frame D302 drawn by A, thereby enclosing the added line D406 and the moved circle D202a. The modification effect is shown in FIG. 36.

Embodiment 3 of Invention D

Figures 37A, 37B:
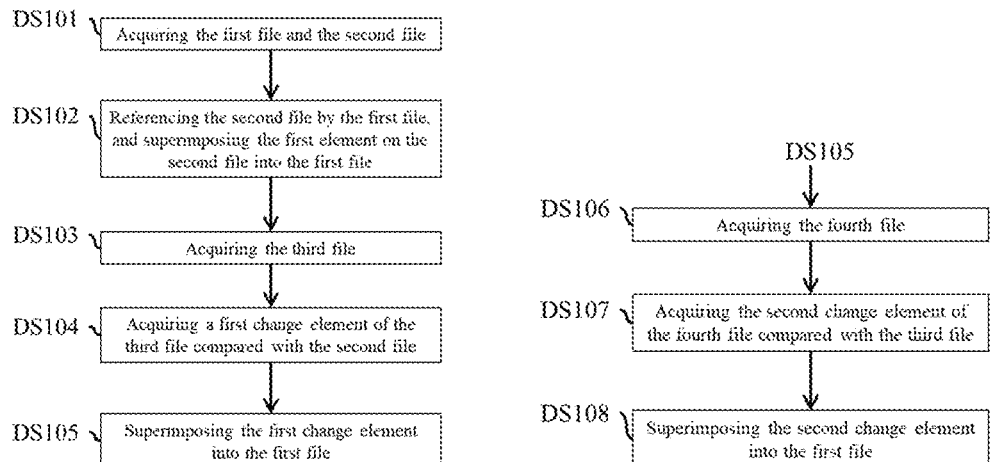
FIG. 37a is a flow chart of an embodiment of a method for viewing reference change of a CAD graph in an editable drawing environment in the present invention.
FIG. 37b is a flow chart of an embodiment of a method for viewing reference change of a CAD graph in an editable drawing environment in the present invention.
Figure 38:
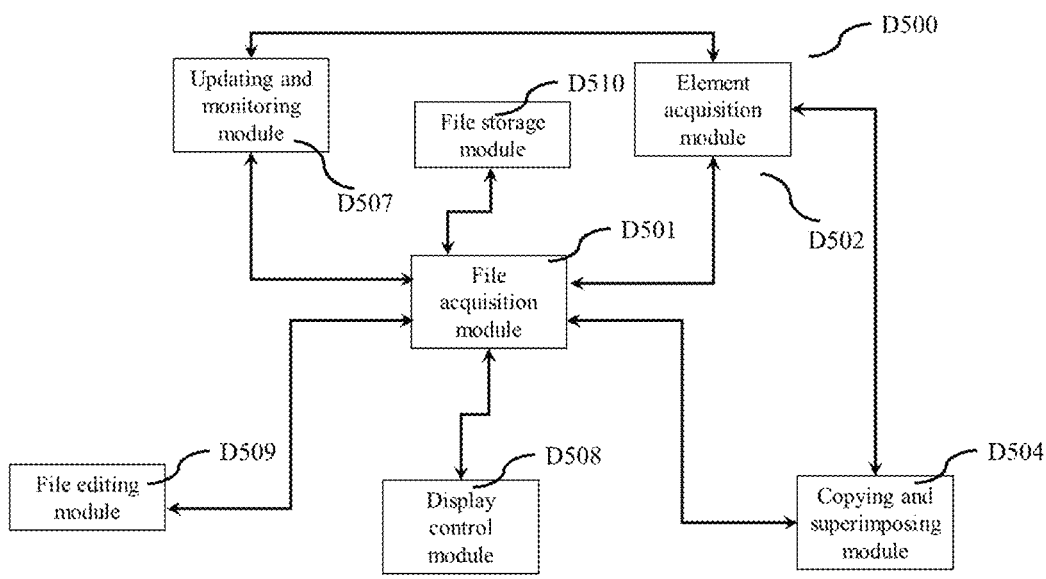
FIG. 38 is a schematic diagram of an embodiment of a system for viewing reference change of a CAD graph in an editable drawing environment in the present invention.

Invention D discloses a method for viewing reference change of a CAD drawing in an editable environment, comprising the following steps (FIG. 37a): DS101 acquiring a first file and a second file; DS102 referencing the second file by the first file, and superimposing a first element on the second file into the first file; DS103 acquiring a third file; DS104 acquiring the first change element of the third file compared with the second file; and DS105 superimposing the first change element into the first file.

In some embodiments, on the first file, the first element superimposed is displayed in a first display mode; and displaying the first change element superimposed in a second display mode. According to the conditions of different application scenarios, the first display mode and the second display mode may adopt different colors, different line styles (such as dotted and solid lines, thick and thin lines), and different highlighting modes (for example, the change elements can be translucent or in watermark mode).

In some embodiments, on the first file, the elements shared by the second file and the third file are displayed in the first mode; the elements that only exist in the second file are displayed in a second mode; and the elements that only exist in the third file are displayed in a third mode.

It should be noted that different nouns are used here for the display modes, such as "Xth display mode" and "Xth style display" for the main purpose of distinguishing different display systems in different embodiments. In the embodiments of Invention D, the selection of the display modes is mainly used for the user to clearly view the changes of the contents of the referenced file. Any display mode that can achieve the objective in the CAD system is applicable to Invention D, and shall be included within the protection scope of Invention D.

In some embodiments, Invention D further comprises: editing the first file and drawing a second element on the first file.

In some embodiments, Invention D also comprises the following steps (FIG. 37b): DS106 acquiring a fourth file; DS107 acquiring the second change element of the fourth file compared with the third file; and DS108 superimposing the second change element into the first file.

In some embodiments, in Invention D, on the first file, the second change element superimposed is displayed in a third display mode.

In some embodiments, the first change element includes one or more of an added element (for example, a CAD entity line is added to the referenced drawing), a deleted element (for example, a CAD entity line on the referenced drawing is deleted) and a modified element (for example, the position of a CAD entity line on the referenced CAD drawing is moved or lengthened or shortened or rotated by an angle or drawn into an arc).

In some embodiments, the first change element is incremental data based on the third file compared with the second file. In some embodiments, the second file and the third file are different versions of the same CAD drawing. In some embodiments, Invention D further comprises: storing the first file, the second file and the third file.

Embodiment 4 of Invention D

Invention D also discloses a system D500 for viewing reference change of a CAD drawing in an editable environment, comprising: a file acquisition module D501, an element acquisition module D502, a copying and superimposing module D504 and an updating and monitoring module D507; the file acquisition module D501 is configured to acquire a first file and a second file; the element acquisition module D502 is connected with the file acquisition module D501 and configured to acquire a first element on the second file; the copying and superimposing module D504 is connected with the element acquisition module D502 and configured to superimpose the first element into the first file; the updating and monitoring module D507 is connected with the file acquisition module D501 and configured to prompt the file acquisition module D501 to acquire a third file, compare the second file with the third file, and find a first change element; and the element acquisition module D502 is connected with the updating and monitoring module D507 and configured to acquire the first change element and superimpose the first change element into the first file through the copying and superimposing module D504.

In some embodiments, the above modules may be achieved by computer software and hardware in the local computer terminal of the user, or part of the modules are achieved on a local computer and part of the modules are achieved on a remote server, or all the modules are located on the remote server, and the operation results of the modules are displayed on a local display through the network.

Compared with the traditional CAD system, it is obvious that Invention D superimposes the change elements and updated contents into the CAD drawing which is currently being edited, so that the current CAD user does not close or remove the current CAD drawing and can simultaneously see the changes. Therefore, the user can continue to edit the current CAD drawing, so that collaborative design is more convenient, and the working efficiency is higher.

In some embodiments, the file acquisition module D501 can acquire the files from a local computer terminal (that is, the files that are stored in the local computer by the drawing engineer and can be used in the CAD system), or CAD files created in local CAD drawing software, or CAD files obtained from the remote end terminal of the server or cloud through network transmission. When the CAD file is acquired from the remote terminal of the server, all related files of a large CAD drawing project can be transmitted in the form of a file package, or based on the existing CAD drawings locally, the incremental data can be superposed and absorbed to generate the required CAD files.

In some embodiments, the operating mechanism of the element acquisition module D502 is to acquire satisfactory elements by analyzing and parsing the attributes of elements (such as entities, objects, blocks and groups), or in the systems of some embodiments, some marks/identifiers/tags are identified to acquire the required CAD elements.

In some embodiments, the copying and superposition mean that the required elements are copied and then added to the CAD drawing which is currently being drawn. However, the introduced elements which are copied and superimposed are only used as reference objects for the current CAD drawing, and cannot be modified by the current CAD user. For example, when the electrical engineer and the HVAC engineer reference the construction CAD drawings, even if the engineers have suggestions for the wall arrangement of the drawings provided by the construction engineers, the suggestions shall be fed back, for example, by adding comments to the collaborative system, to the construction engineers, as the electrical engineer and the HVAC engineer are not allowed to modify the drawings; otherwise, confusion may occur in the collaborative design project. In different application scenarios, Invention D can be applied in different modes. For example, in some embodiments, the referenced contents are only displayed on different layers and can be modified. When storing the CAD drawings, the downstream electrical engineer and the HVAC engineer only respectively store the electrical contents and the HVAC contents, rather than storing the construction contents (that is, the electrical CAD drawing and the HVAC CAD drawing only have the electrical CAD elements and HVAC CAD elements respectively). Of course, the referenced contents such as construction can also be stored together. In other embodiments, the modification authority can be locked by setting identifiers/marks/tag for the referenced contents so that the referenced contents cannot be modified. Of course, in some application scenarios and embodiments, "chief designers" or "chief design teams" may exist, and the designers can be given the authority to modify the referenced contents. For example, the chief designers can adjust the elements of construction, water supply and drainage, electrical and HVAC at the end of the project.

In some embodiments, Invention D also comprises a display control module D508 operable for displaying the first element superimposed in the first display mode; and displaying the first change element superimposed in a second display mode.

In some embodiments, Invention D also comprises a display control module D508. The display control module is operable to be used for, on the first file, displaying elements commonly shared by the second file and the third file in a first mode; displaying elements that only exist in the second file in a second mode; and displaying elements that only exist in the third file in a third mode.

In some embodiments, Invention D further comprises a file editing module D509 used for editing the first file and drawing a second element on the first file.

In some embodiments, the file acquisition module D501 is configured to acquire a fourth file; and the updating and monitoring module D507 is configured to compare the third file with the fourth file, find a second change element and superimpose the second change element into the first file through the copying and superimposing module D504.

In some embodiments, on the first file, the display control module D508 is used for displaying second change element superimposed in a third display mode. In some embodiments, the first change element comprises one or more of an added element, a deleted element and a modified element. In some embodiments, the first change element is incremental data based on the third file compared with the second file. In some embodiments, the second file and the third file are different versions of the same CAD drawing. In some embodiments, Invention D further comprises a file storing module configured to store the first file, the second file and the third file. The file storage module can be positioned in the local computer terminal or in the cloud server.

Embodiment 5 of Invention D

Invention D also discloses a computer readable storage medium for viewing reference change of a CAD drawing in an editable environment, comprising a group of instructions. When the instructions are being executed, at least one processor performs the following operations: DS101 acquiring a first file and a second file; DS102 referencing the second file by the first file, and superimposing a first element on the second file into the first file; DS103 acquiring a third file; DS104 acquiring a first change element of the third file compared with the second file; and DS105 superimposing the first change element into the first file.

Embodiment 6 of Invention D

Invention D also discloses a computer terminal for viewing reference change of a CAD drawing in an editable environment, comprising at least one processor, and a computer readable storage medium coupled to the processor, wherein the computer readable storage medium comprises a group of instructions; when the instructions are being executed by at least one processor, at least one processor performs the following operations: DS101 acquiring a first file and a second file; DS102 referencing the second file by the first file, and superimposing a first element on the second file into the first file; DS103 acquiring a third file; DS104 acquiring a first change element of the third file compared with the second file; and DS105 superimposing the first change element into the first file.

It should be noted that the objective of Invention D is to view the changes of the referenced and consulted contents, not to view the changes of the CAD drawing which is being currently edited. Namely, A references B, and A can see the contents of B when drawing for reference only, but cannot modify B. A can only draw and modify the elements of A. At this moment, if B is modified, then A can use the system and method provided by Invention D to view the changes of the current B relative to the old B, and can correspondingly modify the contents of A's own drawing.

It can be seen through the above embodiments that the technical problems addressed by Invention D and the achieved technical effects are as follows: Invention D provides a method for viewing reference change of a CAD drawing in an editable drawing environment, which allows the user to conveniently view and confirm the contents of reference change and to graphically show modified contents in an editable interface, to intuitively display various modifications such as addition, deletion and change and make various modifications clear. The user can conveniently edit the contents of the graph which is currently being drawn by the user according to the modification of the referenced content, which greatly eases the communication burden among the CAD collaborative work users and improves the working efficiency. Moreover, the CAD users are allowed to edit the content which is currently being drawn by the users while viewing the modifications of the referenced content, which is convenient and efficient.

The above embodiments are only used for describing the technical solution of Invention D rather than limiting the same. Although Invention D is described in detail by referring to the above embodiments, those ordinary skilled in the art should understand that: the technical solution recorded in each of the above embodiments can be still amended, or part or all of technical features therein can be replaced equivalently. However, the changes or replacements do not make the essence of the corresponding technical solution depart from the scope of the technical solutions of embodiments of Invention D, and shall be covered within the scope of the claims and the description of Invention D. For example, the application scenario of Invention D can be carried out in the local computer (in the local software, PC version), or completely carried out in the cloud, and the local computer is only a display (that is, Invention D is applied to the network software). In addition, in some embodiments and application scenarios, the display modes of some contents can be the same. For example, the first display mode and the second display mode in embodiment 3 of Invention D are set to be the same, but different from the third display mode (that is, in this scenario, the first change does not need to be concerned).

Figure 39:
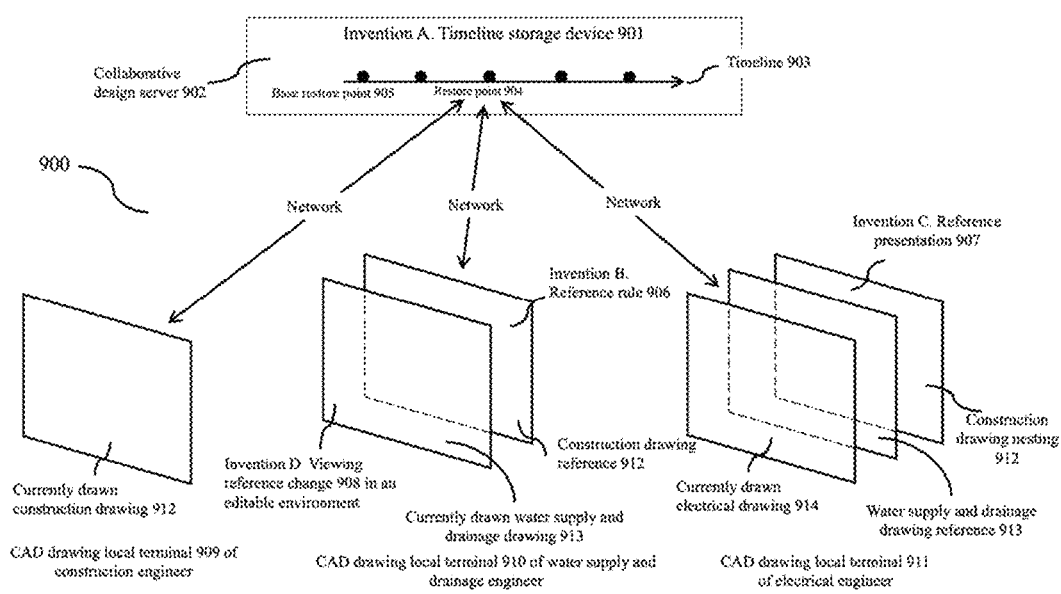
FIG. 39 is a schematic diagram of an embodiment of a CAD collaborative design system in the present invention.

It should be noted that four sub-inventions (901, 906, 907 and 908) of the present invention are part of the collaborative design system 900 of the present invention, are technically connected, can be combined, integrated and merged according to actual needs, and can also be adjusted and modified according to actual conditions in the process of combination, integration and merge (FIG. 39).

For example, in some embodiments, the present invention provides a referencing method for an external file in a CAD system, comprising the following steps: creating at least one first general referencing rule file independent of a first referenced file according to at least one referencing condition, and storing the first general referencing rule file independently in an extensible file format; copying and superimposing a first element filtered and screened from the first referenced file through the first general referencing rule file into a current file; associating the first element with a first control point; and achieving independent operation for the first element through the first control point.

The present invention will be described in combination with a practical application scenario: an electrical engineer sets a general referencing rule file for an electrical drawing 914 (referred to as "electrical referencing rule .XML") on the terminal 911 of the CAD collaborative design system. When referencing a water supply and drainage referencing drawing 913, the electrical engineer filters out water supply and drainage CAD elements related to the electrical design, copies and superimposes the CAD elements into the electrical drawing 914 under editing, and associates the water supply and drainage CAD elements with control points of the water supply and drainage elements, so as to independently operate the copied and superimposed water supply and drainage CAD elements through the control points of the water supply and drainage elements (operation modes include, but are not limited to, display, hiding, binding, unbinding, reloading or unloading). In these embodiments, the electrical engineer not only filters out CAD elements that are not related to electricity during reference (through the electrical referencing rule files), but also flexibly controls the display and hiding of the referenced content.

In some embodiments, the present invention also comprises: using a first general referencing rule file to filter content of a second referenced file; copying and superimposing filtered and screened second element into a current file; associating the second element with a second control point; and achieving independent operation for the second element through the second control point.

As described in combination with the scenario: besides referencing the water supply and drainage drawing 913, the electrical engineer may also need to reference the HVAC drawing (i.e., the second referenced file). Because the electrical referencing rule files in the present invention are stored independently and extensible, the electrical engineer can apply the same electrical referencing rule file (or modified electrical referencing rule files) to the HVAC drawing to filter out HVAC CAD elements related to the electrical design and copy and superimpose the HVAC CAD elements into the current electrical CAD drawing. The filtered HVAC CAD elements are set to be associated with HVAC control points, i.e., the copied and superimposed HVAC CAD elements can be independently operated through the HVAC element control points (the operation modes include, but are not limited to, display, hiding, binding, unbinding, reloading or unloading).

Because different control points are set, the operations of the water supply and drainage elements and the HVAC elements can be performed independently.

In some embodiments, the first referenced file comprises a third element copied and superimposed from a third referenced file; the third element is filtered and screened from the third referenced file through the first general referencing rule file and copied and superimposed into the first referenced file; the third element is associated with a third control point; and independent operation for the third element can be achieved through the third control point.

As described in combination with the scenario: the electrical engineer references the water supply and drainage drawing 913, and also references the construction drawing 912 (i.e., a nesting relationship is generated). The electrical referencing rule files designed by the electrical engineer are actually shared by the water supply and drainage engineer. The water supply and drainage engineer actually uses the same referencing rules when referencing the construction drawing 912 in the process of drawing the water supply and drainage drawing 913 on the terminal 910. The filtered construction elements are set to be associated with the construction element control points, that is, the construction CAD elements copied and superimposed on the electrical drawings can be independently operated through the construction element control points (the operation modes include, but are not limited to, display, hiding, binding, unbinding, reloading or unloading).

In some embodiments, the present invention also comprises the following steps: acquiring a fourth referenced file, wherein the fourth referenced file is modified based on the first referenced file; after change between the fourth referenced file and the first referenced file is filtered and screened by the first general referencing rule file, obtaining relevant change elements; copying and superimposing the relevant change elements into the current file; and presenting the relevant change elements and the first element in the current file in different display modes.

As described in combination with the scenario: the water supply and drainage drawing referenced by the electrical engineer is modified by the water supply and drainage engineer on the computer terminal 910, leading to a new version of the water supply and drainage drawing. The collaborative design system prompts the electrical engineer that the water supply and drainage drawing is changed, and then the electrical engineer downloads the new version of the water supply and drainage drawing (i.e., the fourth referenced file) from the server. The collaborative design system finds the changed CAD elements by comparing the new and old versions of the water supply and drainage drawings. Some of the changed CAD elements are related to the design of the electrical engineer, and some are irrelevant. Therefore, these change elements can also be filtered through the electrical referencing rule files (e.g., filtered according to the information in the attributes), and then the relevant change elements are copied and superimposed into the electrical drawing. These change elements are displayed in easily distinguishable modes (e.g., different colors and styles), so that the electrical engineer can clearly see the changes of the water supply and drainage drawing and can accordingly continue to edit one's own electrical drawing.

In some embodiments, the current file is edited while referencing the relevant change elements. Because the relevant change elements are copied and superimposed onto the current electrical drawing, the electrical engineer can reference the changes of the water supply and drainage drawing on the same operation interface while continuing to modify the own electrical drawing.

In some embodiments, a data summary file is generated based on the current file after editing; incremental data detailed information generated after the editing of the current file is saved in an incremental database; and the data summary file comprises a saving path of the incremental data detailed information in the incremental database.

As described in combination with the scenario: after the electrical engineer edits one's own electrical drawing 914, the electrical engineer can submit one's own electrical drawing 914 to the timeline storage device in the server. The timeline storage device compares the electrical drawings before and after the modification of the electrical engineer, stores the changes into the incremental database in the form of the incremental data, and forms a new data summary file and a related restore point 904.

The restore point 904 is located on the timeline 903. The timeline 903 is a global timeline of the collaborative design project in which the electrical engineer participates (i.e., each restore point contains all the CAD files related to the project at the time point). The base restore point is 905, which includes the electrical drawing drawn earliest by the electrical engineer. If the electrical engineer needs to view the earliest drawing, the electrical engineer only needs to acquire the data summary file from the restore point. The detailed information of the CAD elements recorded in the data summary file can be acquired from the incremental database, so as to quickly and accurately restore and generate the earliest electrical CAD drawing.

Of course, in different embodiments, specific implementations may be different. For example, the computer terminal used by the electrical engineer can recognize the differences between the new and the old versions of the electrical drawings, and uploads the detailed information of the incremental data corresponding to the differences to the incremental database in the server, thereby lessening the burden of data transmission.

It should be noted that terms of "comprise", "include" or any other variant herein are intended to cover non-exclusive inclusion, so that a process, a method, an article or a device which includes a series of elements not only includes such elements, but also includes other elements not listed clearly or also includes inherent elements in the process, the method, the article or the device. Under the condition of no more limitation, the elements defined by a sentence "include one . . . " do not exclude additional identical elements in the process, the method, the article or the device which includes the elements.

Through the description of the above embodiments, those skilled in the art can clearly understand that the above embodiment methods can be achieved in the manner of using software and a necessary common hardware platform and certainly can also be achieved using hardware. However, in many cases, the former is a better implementation. Based on such understanding, the technical solution of the present invention can be reflected in a form of a software product in essence or in a part of making a contribution to the prior art. The computer software product is stored in a storage medium (such as an ROM/RAM, a disc and a CD), including several instructions to enable one computer terminal (which may be a mobile phone, a computer, a server or a network device) to execute the methods of various embodiments of the present invention.

The embodiments of the present invention are described above with reference to the drawings, but the present invention is not limited to the above specific embodiments. The above specific embodiments are only illustrative, not restrictive. Under the enlightenment of the present invention, those ordinary skilled in the art can make many forms without departing from the purpose of the present invention and the protection scope of the claims, and these forms are protected by the present invention.

The invention claimed is:

1. A timeline management system for CAD files, comprising an incremental database:
   a first data summary file, wherein,
      the first data summary file is generated based on one or more first CAD files, and is saved in a full-file snapshot mode;
      the first data summary file comprises a first data item index table and first data summary information which relates to the one or more first CAD files;
      the incremental database stores first data detailed information corresponding to the first data summary information, wherein the first data detailed information comprises a metadata item; wherein the first data detailed information comprises one or more CAD elements from the one or more first CAD files;
      the first data item index table stores the location of the first data detailed information in the incremental database, and is operable to search the first data detailed information in the incremental database;
      the first data summary file is configured to be associated with a first restore point;
   a second data summary file, wherein
      the second data summary file is generated based on one or more second CAD files, and is saved in the full-file snapshot mode;
      the second data summary file comprises a second data item index table and second data summary information which relates to the one or more second CAD files;
      incremental data detailed information of the second data summary information relative to the first data summary information is stored in the incremental database;
      the second data item index table stores location of second data detailed information in the incremental database, and is operable to search the second data detailed information in the incremental database; wherein the second data detailed information corresponds to the second data summary information; and the second data detailed information comprises (i) the incremental data detailed information, and (ii) part or all of the first data detailed information; and
      the second data summary file is configured to be associated with a second restore point;
   a time axis, wherein the first restore point and the second restore point are arranged on the time axis in sequence according to their respective creating time.

2. The timeline management system for the CAD files according to claim 1, wherein the time axis comprises a plurality of restore points, and the plurality of restore points are arranged in sequence according to their respective creating time.

3. The timeline management system for the CAD files according to claim 1, the one or more first CAD files and the one or more second CAD files are related to a same project.

4. The timeline management system for the CAD files according to claim 1, wherein the first data summary information comprises one or more summary information of author information, creating time, modification time and/or thumbnails.

5. The timeline management system for the CAD files according to claim 1, wherein element attributes corresponding to the one or more CAD elements; and the element attributes comprise insertion positions of the elements in a CAD drawing, stretch ratio, starting point and end point information and/or rendering information.

6. A user terminal of a CAD system, comprising:
   a processor and a memory comprising instructions, that when executed by the processor, perform the operations comprising:
      a restore point acquisition module operable for acquiring first restore point from a timeline storage device;
      a restore point analysis module connected with the restore point acquisition module and operable for analyzing a first data summary file associated with the first restore point,
         wherein the first data summary file is generated based on one or more first CAD files, and is saved in a full-file snapshot mode; and the first data summary file comprises a first data item index table and first data summary information, wherein the first data summary information relates to the one or more first CAD files, and the first data item index table stores a location of first data detailed information corresponding to the first data summary information in an incremental database of the timeline storage device; wherein the first data detailed information comprises one or more CAD elements from the first CAD files; wherein the first data detailed information comprises a metadata item;

a file restoration module connected with the restore point analysis module and operable for acquiring the first data item index table and the first data summary information, acquiring the first data detailed information from the incremental database and restoring to generate the one or more first CAD files;

the restore point acquisition module is operable to acquire the first restore point on a time axis in the timeline storage device, wherein the restore point acquisition module also acquires a second restore point from the timeline storage device; wherein the first restore point and the second restore point are arranged on the time axis in sequence according to their respective creating time;

the restore point analysis module acquires a second data summary file through the second restore point, comprising a second data item index table and second data summary information;

wherein the second data summary file is generated based on one or more second CAD files, and is saved in the full-file snapshot mode; and the second data summary file comprises a second data item index table and second data summary information;

wherein the second data summary information relates to the one or more second CAD files, and the second data item index table stores a location of second data detailed information corresponding to the second data summary information in the incremental database of the timeline storage device; wherein the second data detailed information comprises (i) an incremental data detailed information of the second data summary information relative to the first data summary information, and (ii) part or all of the first data detailed information;

the file restoration module acquires the second data detailed information from the incremental database of the timeline storage device based on a second incremental data item index table and the second data summary information, and restores to generate the one or more second CAD files.

7. The user terminal of the CAD system according to claim 6, wherein the one or more first CAD files and the one or more second CAD files are related to a same project.

8. The user terminal of the CAD system according to claim 6, wherein the first data summary information comprises one or more summary information of author information, creating time, modification time, and/or thumbnails.

9. The user terminal of the CAD system according to claim 6, wherein element attributes corresponding to the one or more CAD elements; and the element attributes comprise insertion positions of the elements in a CAD drawing, stretch ratio, starting point and end point information and/or rendering information.

10. A timeline management method for CAD files, comprising the following steps:

acquiring one or more first CAD files;

creating a first data summary file based on the one or more first CAD files, the first data summary file comprising a first data item index table and first data summary information of the one or more first CAD files; wherein the first data summary file is saved in a full-file snapshot mode;

extracting first data detailed information corresponding to the first data summary information from the one or more first CAD files, storing the first data detailed information into an incremental database, and recording a first storage path into the first data item index table, wherein the first data detailed information comprises a metadata item; wherein the first data detailed information comprises one or more CAD elements from the one or more first CAD files;

creating a first restore point and associating the first data summary file with the first restore point;

recording the first restore point on a time axis according to a creating time of the first restore point;

acquiring one or more second CAD files;

creating a second data summary file based on the one or more second CAD files, the second data summary file comprising a second data item index table and second data summary information of the one or more second CAD files; wherein the second data summary file is saved in the full-file snapshot mode;

comparing the first data summary file with the second data summary file; storing an incremental data detailed information of the second data summary file relative to the first data summary file into the incremental database, so that the incremental database comprises all second data detailed information corresponding to the second data summary information; and recording a second storage path into the second data item index table;

creating a second restore point, and associating the second data summary file with the second restore point; and, recording the second restore point on the time axis according to creating time of the second restore point.

11. The timeline management method for the CAD files according to claim 10, wherein the one or more first CAD files and the one or more second CAD files are related to a same project.

12. The timeline management method for the CAD files according to claim 10, wherein the first data summary information comprises one or more summary information of author information, creating time, modification time and/or thumbnails.

13. The timeline management method for the CAD files according to claim 10, wherein element attributes corresponding to the one or more CAD elements; and the element attributes comprise insertion positions of the elements in a CAD drawing, stretch ratio, starting point and end point information and/or rendering information.

* * * * *